(12) United States Patent
Khoshnevisan et al.

(10) Patent No.: US 11,963,163 B2
(45) Date of Patent: Apr. 16, 2024

(54) LCP RESTRICTION BASED ON A CORESET POOL INDEX VALUE

(71) Applicant: QUALCOMM Incorporated, San Diego, CA (US)

(72) Inventors: Mostafa Khoshnevisan, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/445,366

(22) Filed: Aug. 18, 2021

(65) Prior Publication Data

US 2022/0061072 A1    Feb. 24, 2022

Related U.S. Application Data

(60) Provisional application No. 62/706,513, filed on Aug. 21, 2020.

(51) Int. Cl.
  *H04W 72/1268* (2023.01)
  *H04W 72/0453* (2023.01)
  *H04W 72/23* (2023.01)

(52) U.S. Cl.
  CPC ... *H04W 72/1268* (2013.01); *H04W 72/0453* (2013.01); *H04W 72/23* (2023.01)

(58) Field of Classification Search
  None
  See application file for complete search history.

(56) References Cited

U.S. PATENT DOCUMENTS

2020/0163023 A1\* 5/2020 Pelletier ............... H04W 52/38
2020/0196343 A1\* 6/2020 Marinier ............... H04L 5/0094
(Continued)

OTHER PUBLICATIONS

Intel Corporation: "LCP Restrictions and Modelling", 3GPP Draft, 3GPP TSG-RAN WG2 Meeting #99bis, R2-1710634, 3rd Generation Partnership Project (3GPP), Mobile Competence Centre, 650, Route Des Lucioles, F-06921 Sophia-Antipolis Cedex, France, vol. RAN WG2, No. Prague, Czech, Oct. 9, 2017-Oct. 13, 2017 Oct. 8, 2017 (Oct. 8, 2017), XP051342668, pp. 1-4, Retrieved from the Internet: URL: http://www.3gpp.org/ftp/Meetings_3GPP_SYNC/RAN2/Docs/ [retrieved on Oct. 8, 2017] the whole document.

(Continued)

*Primary Examiner* — Srinivasa R Reddivalam
(74) *Attorney, Agent, or Firm* — Harrity & Harrity, LLP

(57) ABSTRACT

Various aspects of the present disclosure generally relate to wireless communication. In some aspects, a user equipment (UE) may receive a logical channel prioritization (LCP) restriction configuration for a logical channel indicating one or more control resource set (CORESET) pool index values associated with the logical channel. The UE may receive an uplink grant for transmission of an uplink communication, the uplink grant being associated with a CORESET pool index value of the one or more CORESET pool index values. The UE may select the logical channel to use resources of the uplink grant for transmission of the uplink communication based at least in part on the CORESET pool index value and the LCP restriction configuration. Numerous other aspects are provided.

33 Claims, 12 Drawing Sheets

(56) References Cited

U.S. PATENT DOCUMENTS

2020/0322109 A1\* 10/2020 Yu ........................ H04B 7/0617
2021/0337525 A1\* 10/2021 Rahman ................ H04L 5/0094

OTHER PUBLICATIONS

International Search Report and Written Opinion—PCT/US2021/046690—ISA/EPO—dated Dec. 2, 2021.
Qualcomm Incorporated: "Enhancements on Multi-TRP for PDCCH, PUCCH and PUSCH", 3GPP Draft, 3GPP TSG-RAN WG1 Meeting #102-e, R1-2006791, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020 Aug. 8, 2020 (Aug. 8, 2020), XP051918241, pp. 1-14, Retrieved from the Internet: URL: https://ftp.3gpp.org/tsg_ran/WG1_RL1/TSGR1_102-e/Docs/R1-2006791.zip R1-2006791 Enhancements on Multi-TRP for PDCCH, PUCCH and PUSCH.docx [retrieved on Aug. 8, 2020] p. 1, 1 Introduction pp. 2-4, 2.2 Different Approaches for Multi-TCI State, pp. 11-12, 4 PUSCH.
Samsung: "Summary of Proposed Corrections (AI 6.16.3)", 3GPP Draft, 3GPP TSG-RAN2 Meeting #109bis Electronic, R2-2003795, 3rd Generation Partnership Project (3GPP), Mobile Competence Centre, 650, Route Des Lucioles, F-06921 Sophia-Antipolis Cedex, France, vol. RAN WG2, No. Electronic, Apr. 20, 2020-Apr. 24, 2020 Apr. 17, 2020 (Apr. 17, 2020), XP051876582, 12 Pages, Retrieved from the Internet: URL: https://ftp.3gpp.org/tsg_ran/WG2_RL2/TSGR2_109bis-e/Docs/R2-2003795.zip R2-2003795_Summary of Proposed Corrections_AI_6_16_3.docx [retrieved on apr. 17, 2020] pp. 1-4, 2.2 SR Aspects pp. 9-10, 2.10 Further Clarifications on the DL MAC CEs, Sections 1-3.

\* cited by examiner

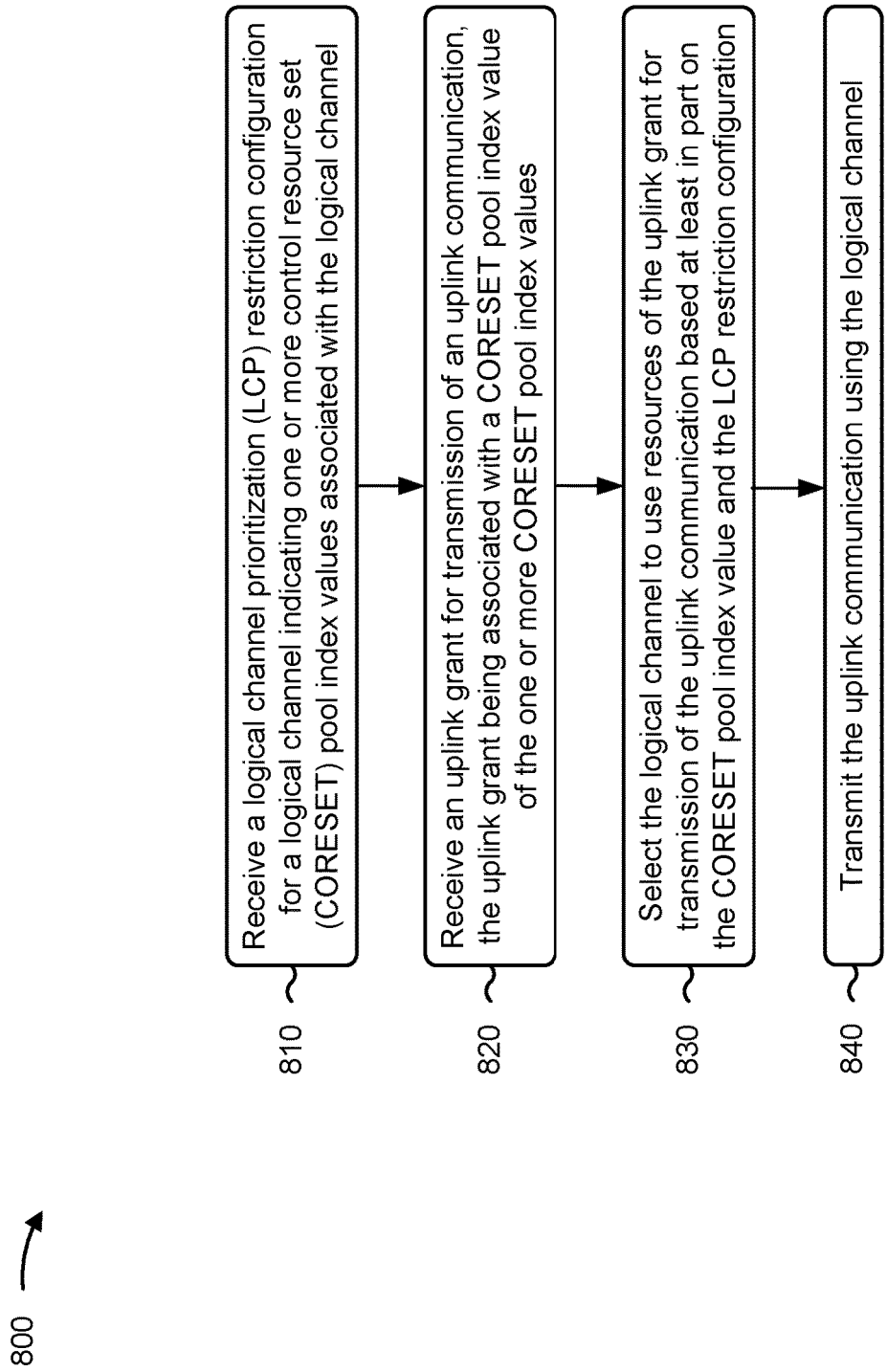

LCP RESTRICTION BASED ON A CORESET POOL INDEX VALUE

CROSS-REFERENCE TO RELATED APPLICATION

This patent application claims priority to U.S. Provisional Patent Application No. 62/706,513, filed on Aug. 21, 2020, entitled "LCP RESTRICTION BASED ON A CORESET POOL INDEX VALUE," which is assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for local channel prioritization (LCP) restriction based on a control resource set (CORESET) pool index value.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Multiple base stations or transmit receive points (TRPs) may communicate with the same UE in a coordinated manner (for example, using coordinated multipoint transmissions or other examples) to improve reliability, increase spatial diversity, increase throughput, or a combination thereof. In some cases, the UE may transmit multiple copies of the same uplink communication, such as a protocol data convergence protocol (PDCP) protocol data unit (PDU), to the TRPs to increase spatial diversity and reliability of transmission of the uplink communication. This may be referred to as PDCP duplication. Typically, the UE transmits each copy of the uplink communication to separate radio link control (RLC) layers associated with each of the TRPs. While the UE may be capable of differentiating between the TRPs if the TRPs (and the associated RLC layers) utilize different serving cells or cell groups, the UE may be unable to differentiate between TRPs where the TRPs (and the associated RLC layers) use the same carrier or serving cell. As a result, the UE may be unable to reliably transmit separate copies of the uplink communication to each TRP.

SUMMARY

In some aspects, a method of wireless communication performed by a user equipment (UE) includes receiving a logical channel prioritization (LCP) restriction configuration for a logical channel indicating one or more control resource set (CORESET) pool index values associated with the logical channel. The method includes receiving an uplink grant for transmission of an uplink communication, the uplink grant being associated with a CORESET pool index value of the one or more CORESET pool index values. The method includes selecting the logical channel to use resources of the uplink grant for transmission of the uplink communication based at least in part on the CORESET pool index value and the LCP restriction configuration. The method includes transmitting the uplink communication using the logical channel.

In some aspects, a method of wireless communication performed by a base station includes transmitting, to a UE, an indication of an LCP restriction configuration for a logical channel, the LCP restriction configuration indicating one or more CORESET pool index values associated with the logical channel. The method includes transmitting, to the UE, an uplink grant for transmission of an uplink communication, the uplink grant being associated with a CORESET pool index value of the one or more CORESET pool index values. The method includes receiving the uplink communication on the logical channel from the UE.

In some aspects, a UE for wireless communication includes at least one processor and at least one memory communicatively coupled with the at least one processor. The at least one memory stores processor-readable code that, when executed by the at least one processor, is configured to cause the UE to receive an LCP restriction configuration for a logical channel indicating one or more CORESET pool index values associated with the logical channel. The at least one memory stores processor-readable code that, when executed by the at least one processor, is configured to cause the UE to receive an uplink grant for transmission of an uplink communication, the uplink grant being associated with a CORESET pool index value of the one or more CORESET pool index values. The at least one memory stores processor-readable code that, when executed by the at least one processor, is configured to cause the UE to select the logical channel to use resources of the uplink grant for transmission of the uplink communication based at least in part on the CORESET pool index value and the LCP restriction configuration. The at least one memory stores processor-readable code that, when executed by the at least one processor, is configured to cause the UE to transmit the uplink communication using the logical channel.

In some aspects, a base station for wireless communication includes at least one processor and at least one memory communicatively coupled with the at least one processor. The at least one memory stores processor-readable code that, when executed by the at least one processor, is configured to cause the base station to transmit, to a UE, an indication of an LCP restriction configuration for a logical channel, the LCP restriction configuration indicating one or more CORESET pool index values associated with the logical channel. The at least one memory stores processor-readable code that, when executed by the at least one processor, is configured to cause the base station to transmit, to the UE, an uplink grant for transmission of an uplink communication, the uplink grant being associated with a CORESET pool index value of the one or more CORESET pool index values. The at least one memory stores processor-readable code that, when executed by the at least one processor, is configured to cause the base station to receive the uplink communication on the logical channel from the UE.

In some aspects, a non-transitory computer-readable medium storing a set of instructions for wireless communication includes one or more instructions. The one or more instructions, when executed by one or more processors of a UE, cause the UE to receive an LCP restriction configuration for a logical channel indicating one or more CORESET pool index values associated with the logical channel. The one or more instructions, when executed by the one or more processors, cause the UE to receive an uplink grant for transmission of an uplink communication, the uplink grant being associated with a CORESET pool index value of the one or more CORESET pool index values. The one or more instructions, when executed by the one or more processors, cause the UE to select the logical channel to use resources of the uplink grant for transmission of the uplink communication based at least in part on the CORESET pool index value and the LCP restriction configuration. The one or more instructions, when executed by the one or more processors, cause the UE to transmit the uplink communication using the logical channel.

In some aspects, a non-transitory computer-readable medium storing a set of instructions for wireless communication include one or more instruction. The one or more instructions, when executed by one or more processors of a base station, cause the base station to transmit, to a UE, an indication of an LCP restriction configuration for a logical channel, the LCP restriction configuration indicating one or more CORESET pool index values associated with the logical channel. The one or more instructions, when executed by the one or more processors, cause the base station to transmit, to the UE, an uplink grant for transmission of an uplink communication, the uplink grant being associated with a CORESET pool index value of the one or more CORESET pool index values. The one or more instructions, when executed by the one or more processors, cause the base station to receive the uplink communication on the logical channel from the UE.

In some aspects, an apparatus for wireless communication includes means for receiving an LCP restriction configuration for a logical channel indicating one or more CORESET pool index values associated with the logical channel. The apparatus includes means for receiving an uplink grant for transmission of an uplink communication, the uplink grant being associated with a CORESET pool index value of the one or more CORESET pool index values. The apparatus includes means for selecting the logical channel to use resources of the uplink grant for transmission of the uplink communication based at least in part on the CORESET pool index value and the LCP restriction configuration. The apparatus includes means for transmitting the uplink communication using the logical channel.

In some aspects, an apparatus for wireless communication includes means for transmitting, to a UE, an indication of an LCP restriction configuration for a logical channel, the LCP restriction configuration indicating one or more CORESET pool index values associated with the logical channel. The apparatus includes means for transmitting, to the UE, an uplink grant for transmission of an uplink communication, the uplink grant being associated with a CORESET pool index value of the one or more CORESET pool index values. The apparatus includes means for receiving the uplink communication on the logical channel from the UE.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 8 is a flowchart illustrating an example process performed, for example, by a UE, in accordance with the present disclosure.

DETAILED DESCRIPTION

Figure 1:
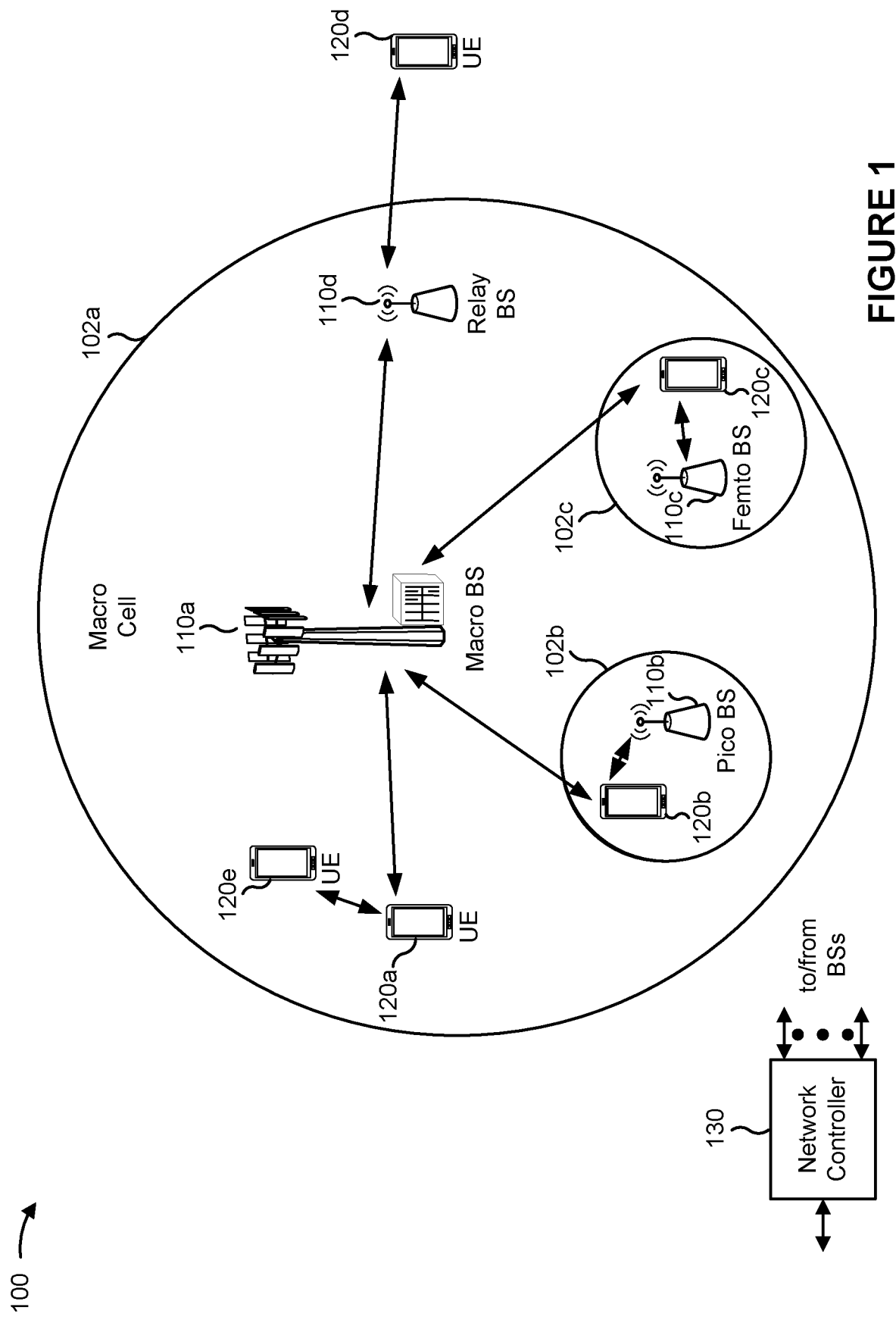
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to logical channel prioritization (LCP) for logical channels on which a user equipment (UE) may communicate with one or more transmit receive points (TRPs). Each logical channel may be associated with a particular TRP, which may also be associated with a particular control resource set (CORESET) pool index value. Some aspects more specifically relate to LCP restriction based on a CORESET pool index value. In some aspects, a UE may determine whether a logical channel is permitted to be used for the transmission of an uplink communication based at least in part on an LCP restriction configuration for the logical channel. The LCP restriction configuration may indicate combinations of component carriers and CORESET pool index values for which the logical channel is allowed to be used. In some examples, the UE may identify a component carrier for transmission of the uplink communication, determine the CORESET pool index value associated with the uplink grant for the uplink communication, and determine whether the LCP restriction configuration for the logical channel indicates that the logical channel is allowed to be used for a combination of the CORESET pool index value and the component carrier. If the LCP restriction configuration indicates that the logical channel is allowed to be used, the UE may select the logical channel to use resources of the uplink grant for transmission of the uplink communication on the component carrier, and may transmit the uplink communication using the logical channel.

Particular aspects of the subject matter described in this disclosure can be implemented to realize one or more of the following potential advantages. As indicated above, each logical channel may be associated with a particular TRP. However, even if multiple TRPs use the same carrier or serving cell, techniques disclosed herein enable a UE to differentiate between multiple TRPs based at least in part on the association between the CORESET pool index values indicated in the LCP restriction configuration and the logical channels associated with the TRPs. This enables the UE to perform LCP restriction for logical channels based on the LCP restriction configuration, which enables the UE to select logical channels for transmitting separate (or duplicate) copies of the uplink communication to different TRPs that use the same carrier or serving cell.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, or a TRP, among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
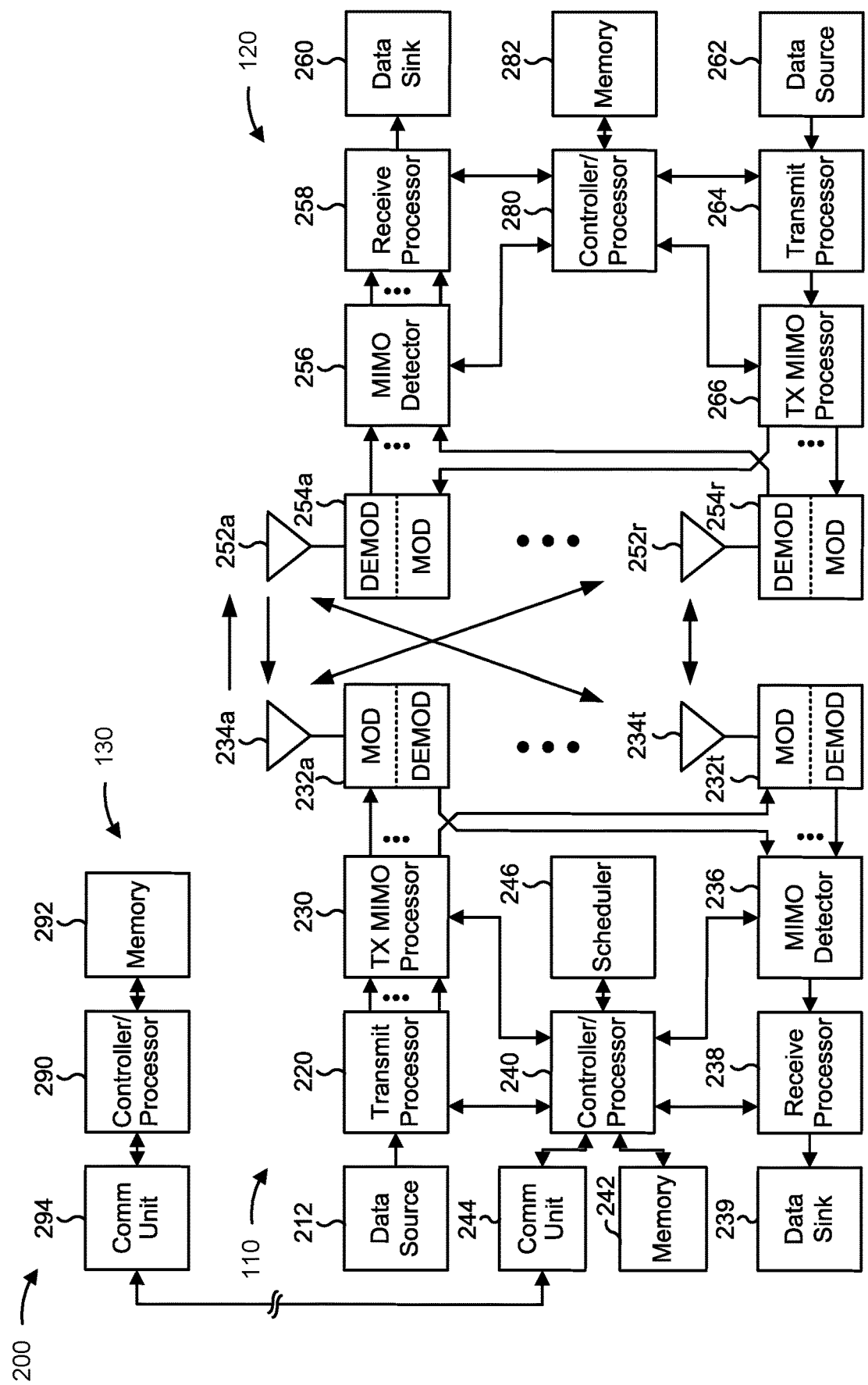
FIG. 2 is a diagram illustrating an example base station (BS) in communication with a user equipment (UE) in a wireless network, in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), or a CQI, among other examples, or combinations thereof. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t and/or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission and/or reception components, such as one or more components of 2.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, a modulator and a demodulator (such as MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (such as MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with LCP restriction based on a CORESET pool index value, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 800 of FIG. 8, process 900 of FIG. 9, or other processes as described herein. In some aspects, executing instructions may include running the instructions, converting the instructions, compiling the instructions, or interpreting the instructions, among other examples.

In some aspects, UE 120 may include means for receiving an LCP restriction configuration for a logical channel indicating one or more CORESET pool index values associated with the logical channel, means for receiving an uplink grant for transmission of an uplink communication, the uplink grant being associated with a CORESET pool index value of the one or more CORESET pool index values, means for selecting the logical channel to use resources of the uplink grant for transmission of the uplink communication based at least in part on the CORESET pool index value and the LCP restriction configuration, means for transmitting the uplink communication using the logical channel, among other examples, or combinations thereof. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

In some aspects, base station 110 may include means for transmitting, to a UE 120, an indication of an LCP restriction configuration for a logical channel, the LCP restriction configuration indicating one or more CORESET pool index values associated with the logical channel, means for transmitting, to the UE 120, an uplink grant for transmission of an uplink communication, the uplink grant being associated with a CORESET pool index value of the one or more CORESET pool index values, means for receiving the uplink communication on the logical channel from the UE 120, among other examples, or combinations thereof. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

Figure 3:
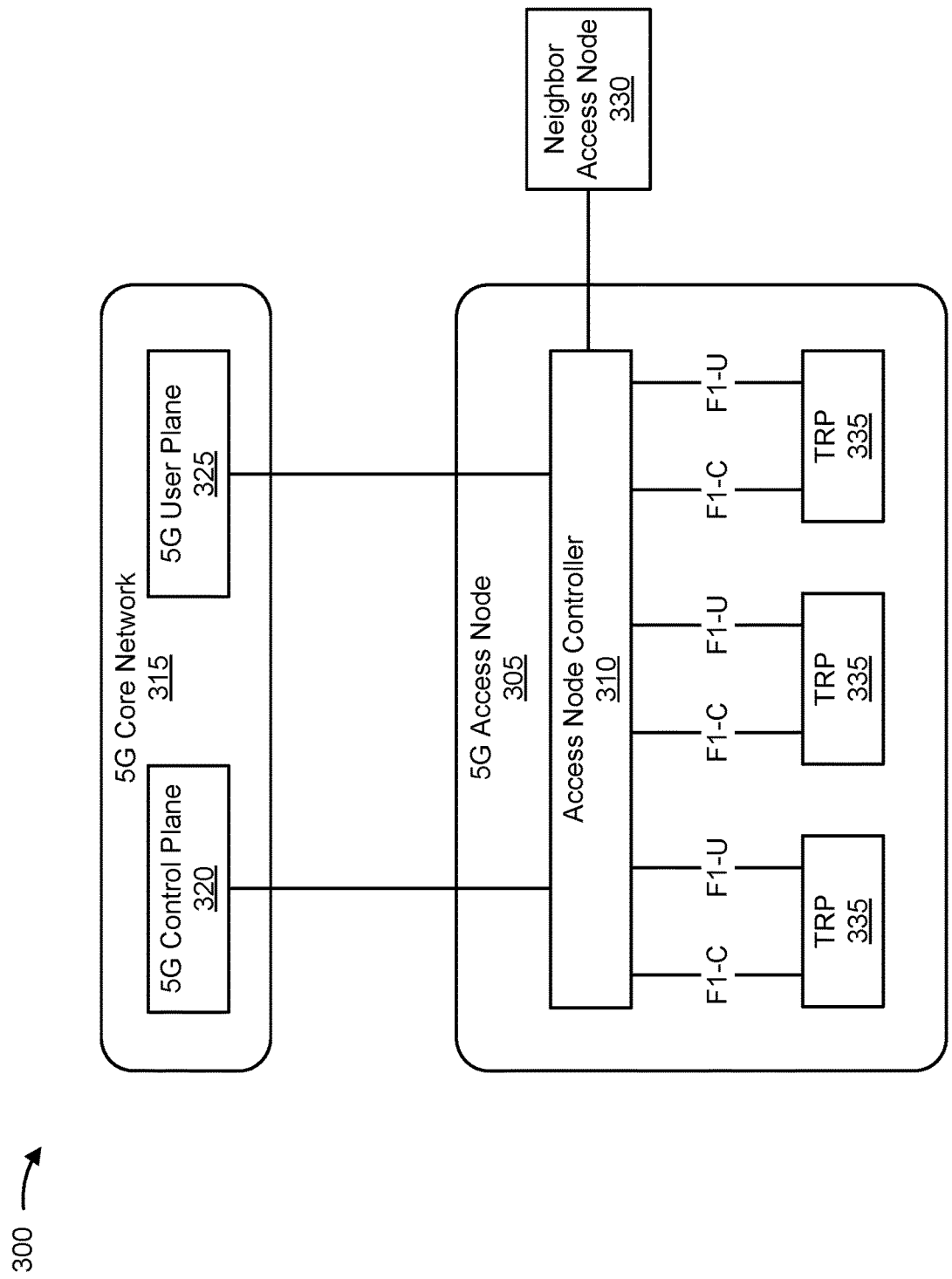
FIG. 3 illustrates an example logical architecture of a distributed radio access network (RAN), in accordance with the present disclosure.

FIG. 3 illustrates an example logical architecture of a distributed RAN 300, according to aspects of the present disclosure.

A 5G access node 305 may include an access node controller 310. The access node controller 310 may be a central unit or a control unit (CU) of the distributed RAN 300. In some aspects, a backhaul interface to a 5G core network 315 may terminate at the access node controller 310. The 5G core network 315 may include a 5G control plane component 320 and a 5G user plane component 325 (such as a 5G gateway), and the backhaul interface for one or both of the 5G control plane and the 5G user plane may terminate at the access node controller 310. Additionally, or alternatively, a backhaul interface to one or more neighbor access nodes 330 (for example, another 5G access node 305, an LTE access node, or other examples) may terminate at the access node controller 310.

The access node controller 310 may include or may communicate with one or more TRPs 335 (for example, via an F1 Control (F1-C) interface or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (such as access node controller 310) or one or more DUs (such as one or more TRPs 335). In some cases, a TRP 335 may be referred to as a cell, a panel, an antenna array, an array, or other examples.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, or other layers may be configured to terminate at the access node controller 310 or at a TRP 335.

In some aspects, multiple TRPs 335 may transmit communications (for example, the same communication or different communications) in the same transmission time interval (TTI) (for example, a slot, a mini-slot, a subframe, a symbol, or other examples) or different TTIs using different quasi-co-location (QCL) relationships (for example, different spatial parameters, different transmission configuration indicator (TCI) states, different precoding parameters, different beamforming parameters, or other examples). In some aspects, a TCI state may be used to indicate one or more QCL relationships. A TRP 335 may be configured to individually (for example, using dynamic selection) or jointly (for example, using joint transmission with one or more other TRPs 335) serve traffic to a UE 120.

Figure 4:
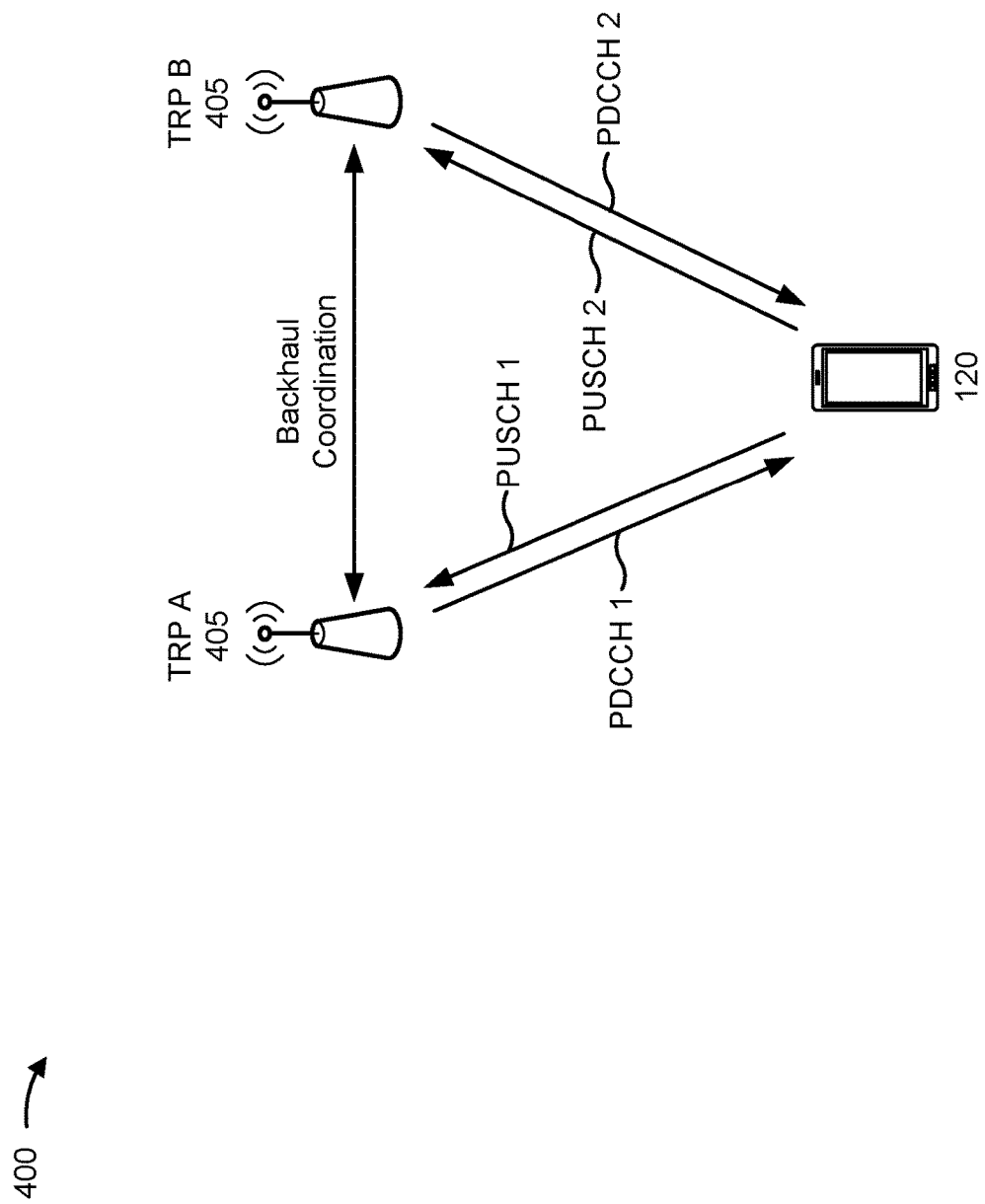
FIG. 4 is a diagram illustrating an example of multiple transmit receive point (TRP) communication, in accordance with the present disclosure.

FIG. 4 is a diagram illustrating an example of a multiple TRP (multi-TRP) communication configuration 400, in accordance with the present disclosure. In some aspects, the example multi-TRP communication configuration 400 may also apply to multi-panel or multi-antenna array communication. As shown in FIG. 4, multiple TRPs 405 may communicate with the same UE 120. A TRP 405 may correspond to a TRP 335 described above in connection with FIG. 3 or a base station 110 described above in connection with FIG. 1.

The multiple TRPs 405 (shown as TRP A and TRP B) may communicate with the same UE 120 in a coordinated manner (for example, using coordinated multipoint transmissions or other examples) to improve reliability, increase spatial diversity, increase throughput, or a combination thereof. The TRPs 405 may coordinate such communications via an interface between the TRPs 405 (for example, a backhaul interface, an access node controller 310, or another type of interface). The interface may have a smaller delay or higher capacity when the TRPs 405 are co-located at the same base station 110 (for example, when the TRPs 405 are different antenna arrays or panels of the same base station 110), and the interface may have a larger delay or lower capacity (as compared to co-location) when the TRPs 405 are located at different base stations 110. The different TRPs 405 may communicate with the UE 120 using different QCL relationships (which may correspond to different TCI states), different demodulation reference signal (DMRS) ports, different layers (for example, of a multi-layer communication), or other examples.

In some aspects, multiple TRPs 405 may communicate with the UE 120 in various multi-TRP transmission modes. One multi-TRP transmission mode may be referred to as Mode 1 or single-downlink control information (DCI) based multi-TRP transmission. In these examples, a single physical downlink control channel (PDCCH) carrying a DCI uplink grant may be used to schedule uplink data communications for a single physical uplink shared channel (PUSCH). In this case, the UE 120 may transmit communications to the multiple TRPs 405 (for example, TRP A and TRP B) on the same PUSCH. For example, a communication may be transmitted using a single codeword with different spatial layers for different TRPs 405 (for example, where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (for example, using different sets of layers). In either case, different TRPs 405 may use different QCL relationships (for example, different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in DCI (for example, transmitted on the PDCCH, such as DCI format 1_0, DCI format 1_1, or other examples) may indicate the first QCL relationship (for example, by indicating a first TCI state) and the second QCL relationship (for example, by indicating a second TCI state). The first and the second TCI states may be indicated using a TCI field in the DCI. In general, the TCI field can indicate a single TCI state (for single-TRP transmission) or multiple TCI states in this multi-TRP transmission mode (Mode 1 or single-DCI).

Another multi-TRP transmission mode may be referred to as Mode 2 or multi-DCI based multi-TRP transmission. In these examples, multiple PDCCHs may be used to schedule uplink data communications for multiple corresponding PUSCHs (one PDCCH for a corresponding one PUSCH, for example). As an example, and as illustrated in FIG. 4, a first PDCCH (PDCCH 1) may include a first DCI uplink grant that schedules a first PUSCH (PUSCH 1) to be transmitted to a first TRP 405 (TRP A), and a second PDCCH (PDCCH 2) may include a second DCI uplink grant that schedules a second PUSCH (PUSCH 2) to be transmitted to a second TRP 405 (TRP B). Furthermore, first DCI (for example, transmitted by the first TRP 405) may schedule a first PUSCH communication associated with a first set of DMRS ports with a first beam, first spatial relation information, first precoding information, a first set of power control values, or a combination thereof for the first TRP 405. Second DCI (for example, transmitted by the second TRP 405) may schedule a second PUSCH communication associated with a second set of DMRS ports with a second beam, second spatial relation information, second precoding information, a second set of power control values, or a combination thereof for the second TRP 405.

Figure 5:
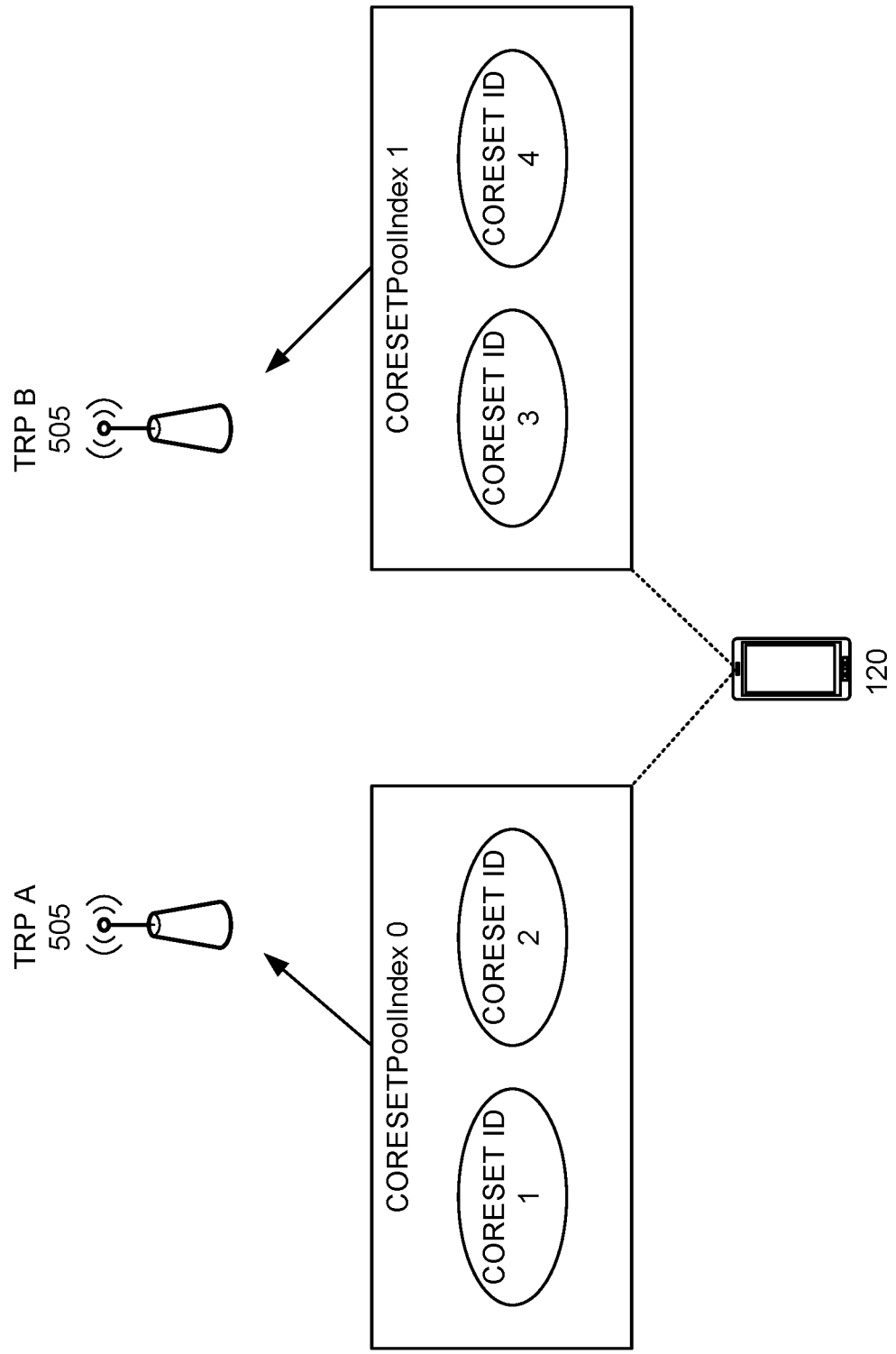
FIG. 5 is a diagram illustrating an example of TRP differentiation at a UE based at least in part on a control resource set (CORESET) pool index, in accordance with the present disclosure.

FIG. 5 is a diagram illustrating an example of TRP differentiation at a UE based at least in part on a CORESET pool index in accordance with the present disclosure. In some aspects, a CORESET pool index (or CORESET-PoolIndex) value may be used by a UE (a UE 120) to identify a TRP associated with an uplink grant received on a PDCCH.

A CORESET may refer to a control region that is structured to support an efficient use of resources, such as by flexible configuration or reconfiguration of resources for one or more PDCCHs associated with a UE. In some aspects, a CORESET may occupy the first symbol of an OFDM slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using radio resource control (RRC) signaling to indicate a frequency domain region (for example, a quantity of resource blocks) or a time domain region (for example, a quantity of symbols) for the CORESET.

As illustrated in FIG. 5, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 5, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 505. As an example, and as illustrated in FIG. 5, a first TRP 505 (TRP A) may be associated with CORESET pool index 0 and a second TRP 505 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

Figures 6A, 6B:
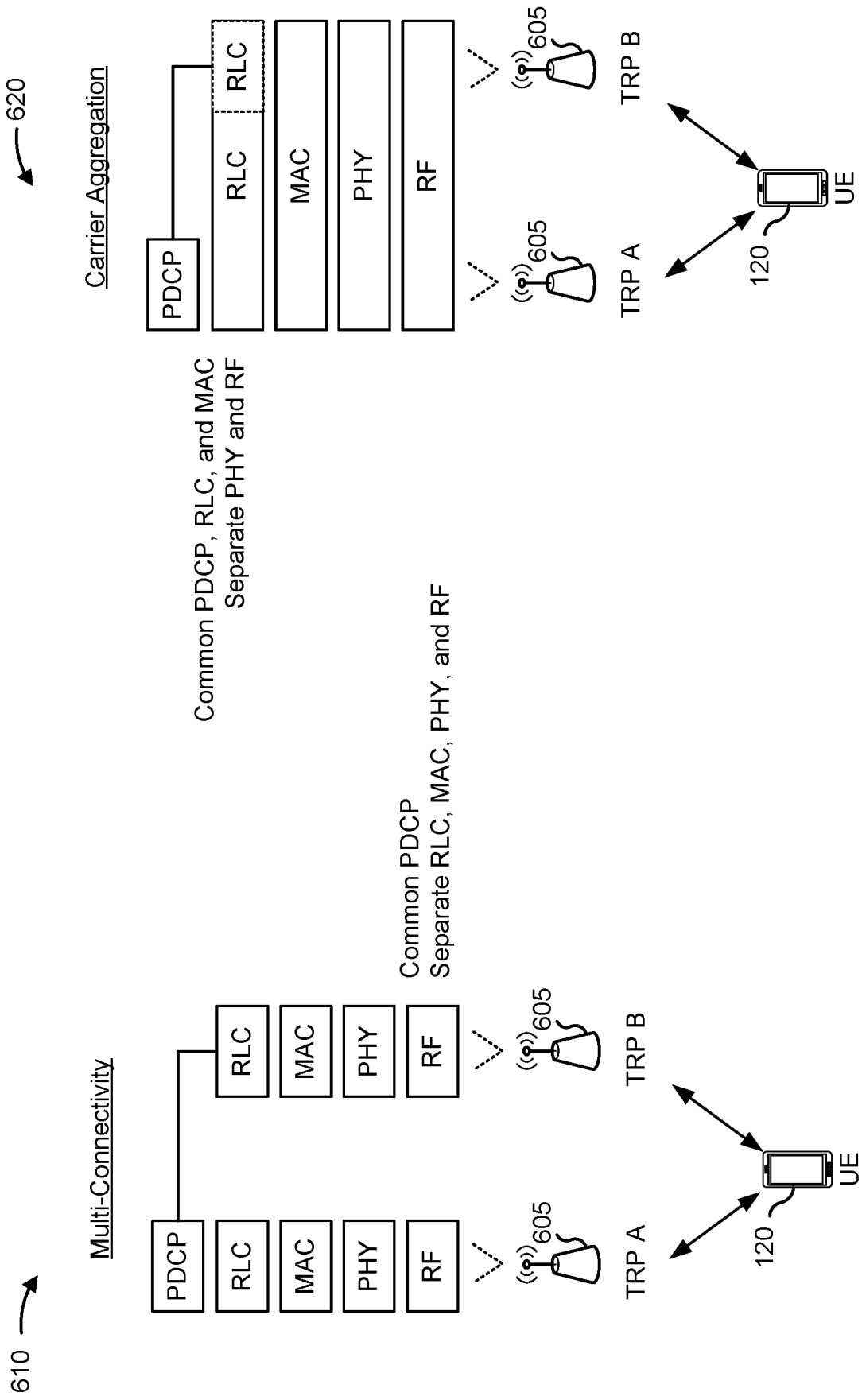
FIGS. 6A and 6B are diagrams illustrating examples of multi-connectivity and carrier aggregation across TRPs, in accordance with the present disclosure.

FIGS. 6A and 6B are diagrams illustrating examples of multi-connectivity and carrier aggregation, in accordance with the present disclosure. As shown in FIGS. 6A and 6B, carrier aggregation and multi-connectivity may be used in a multi-TRP communication configuration including two or more TRPs 605 (such as TRP A and TRP B) configured for a UE 120. Carrier aggregation and multi-connectivity are techniques that may be used to aggregate component carriers (CCs) across a plurality of cells and frequency ranges (for example, 3GPP Frequency Range 1 (FR1) or sub-6 Gigahertz (GHz), 3GPP Frequency Range 2 (FR2) or millimeter wave (mmW), or other frequency ranges) for the UE 120. The capability to aggregate CCs across a plurality of cells and frequency ranges may provide the UE 120 with increased bandwidth, decreased latency, increased reliability, or a combination thereof.

FIG. 6A illustrates an example protocol stack 610 for multi-connectivity. Dual connectivity is an example of multi-connectivity. As shown in FIG. 6A, a multi-connectivity configuration may comprise a multi-TRP deployment configuration in which a common PDCP layer in the protocol stack 610 is shared across two or more TRPs 605 (such as TRP A and TRP B), and the radio link control (RCL) layers, the MAC layers, the physical (PHY) layers, and the radio frequency (RF) layers of the protocol stack 610 are maintained and operated separately for each of the TRPs 605. The TRPs 605 may operate on different frequency bands, on the same frequency bands, or combinations thereof. For example, TRP A may operate on an FR1 frequency band and TRP B may operate on an FR2 frequency band.

The separate and independent RLC layers of the protocol stack 610 for multi-connectivity may impose less of a throughput burden on the backhaul between TRP A and TRP B, relative to carrier aggregation. Moreover, the separate and independent MAC layers of multi-connectivity may result in lower MAC layer complexity relative to carrier aggregation in scenarios where different subcarrier spacings are used between TRP A and TRP B. However, due to separate and independent MAC layers, hybrid automatic repeat request (HARQ) feedback and channel state information (CSI) reporting is separately handled for TRP A and TRP B, which may result in reduced FR2 coverage relative to carrier aggregation.

FIG. 6B illustrates an example protocol stack 620 of carrier aggregation. As shown in FIG. 6B, a carrier aggregation configuration may comprise a multi-TRP deployment configuration in which a common PDCP layer, a common RLC layer, and a common MAC layer of the protocol stack 620 are shared across two or more TRPs 605 (such as TRP A and TRP B), and the PHY layers and RF layers of the protocol stack 620 are maintained and operated separately for each of the TRPs 605. In some aspects, TRP B may be configured with a secondary RLC layer. In these examples, the common RLC layer between TRP A and TRP B may be a primary RLC layer.

In a carrier aggregation configuration, RLC, HARQ feedback, and CSI reporting are handled on TRP A, which allows for increased FR2 coverage in cell group 2 relative to multi-connectivity. Moreover, the common RLC layer and the common MAC layer results in lower latency and faster link adaptation relative to separate and independent RLC layers and MAC layers in multi-connectivity. However, the common RLC layer is handled by a single scheduler for TRP A and TRP B, which imposes a higher backhaul burden on the backhaul between TRP A and TRP B (for example, more information is shared across the backhaul relative to multi-connectivity). Moreover, because TRP A handles HARQ feedback for both TRP A and TRP B with the common MAC layer, HARQ complexity may be increased relative to multi-connectivity in scenarios where TRP A and TRP B operate on different subcarrier spacings.

In a multi-connectivity configuration or in a carrier aggregation configuration, the PDCP layer may be configured to perform services and functions that include sequence numbering, transfer of user data, reordering and duplicate detection, PDCP protocol data unit (PDU) routing (such as for split bearers), retransmission of PDCP service data units (SDUs), and duplication of PDCP PDUs. The RLC layer may be configured to perform services and functions that include the transfer of upper layer PDUs, sequence numbering, segmentation, and re-segmentation.

The MAC layer may be configured to perform services and functions that include mapping between logical channels (LCHs) and transport channels, multiplexing and demultiplexing of MAC SDUs, and LCP. A single logical channel may be mapped to one or more numerologies or TTI durations. For example, in LCP, the MAC layer (such as one MAC entity of the layer) determines a TTI duration or numerology from the physical layer. The MAC layer provides services to the RLC layer in the form of logical channels.

A logical channel is defined by the type of data/information it carries, is generally referred to as a control channel, and is used for transmission of control or configuration or as a traffic channel used for user data. Examples of logical channels include a broadcast control channel (BCCH), a paging control channel (PCCH), a common control channel (CCCH), a dedicated control channel (DCCH), or a dedicated traffic channel (DTCH), among other examples. Each TRP may be associated with a set of logical channels to which uplink communications of the UE 120 may be mapped. For example, TRP A may be associated with a set of logical channels including a BCCH, a PCCH, a CCCH, a DCCH, a DTCH, or a combination thereof. Similarly, TRP B may be associated with a separate set of logical channels including a BCCH, a PCCH, a CCCH, a DCCH, a DTCH, or a combination thereof.

Figure 7A:
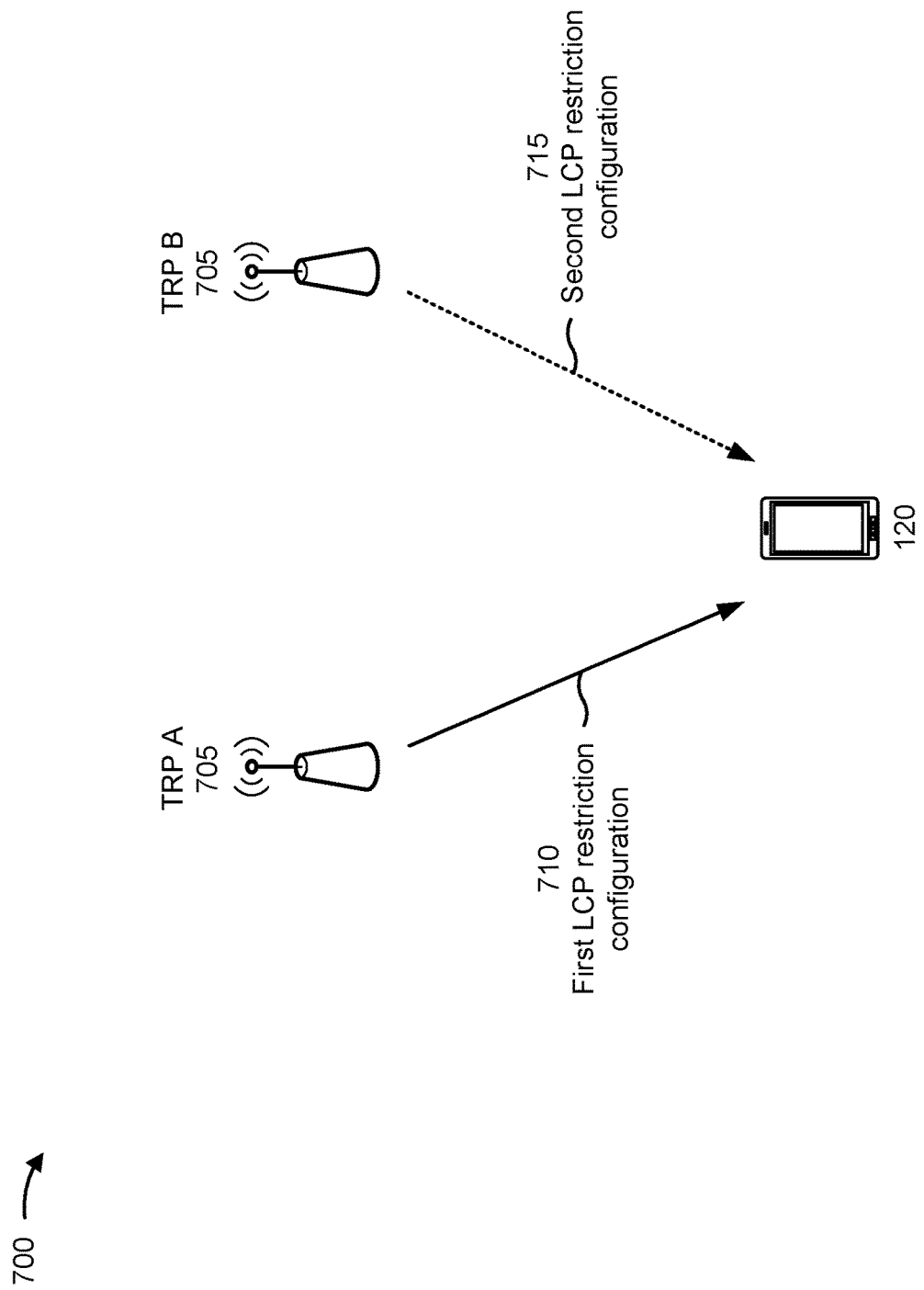
FIGS. 7A and 7B are diagrams illustrating one or more examples associated with local channel prioritization (LCP) restriction based on a CORESET pool index value, in accordance with the present disclosure.
Figure 7B:
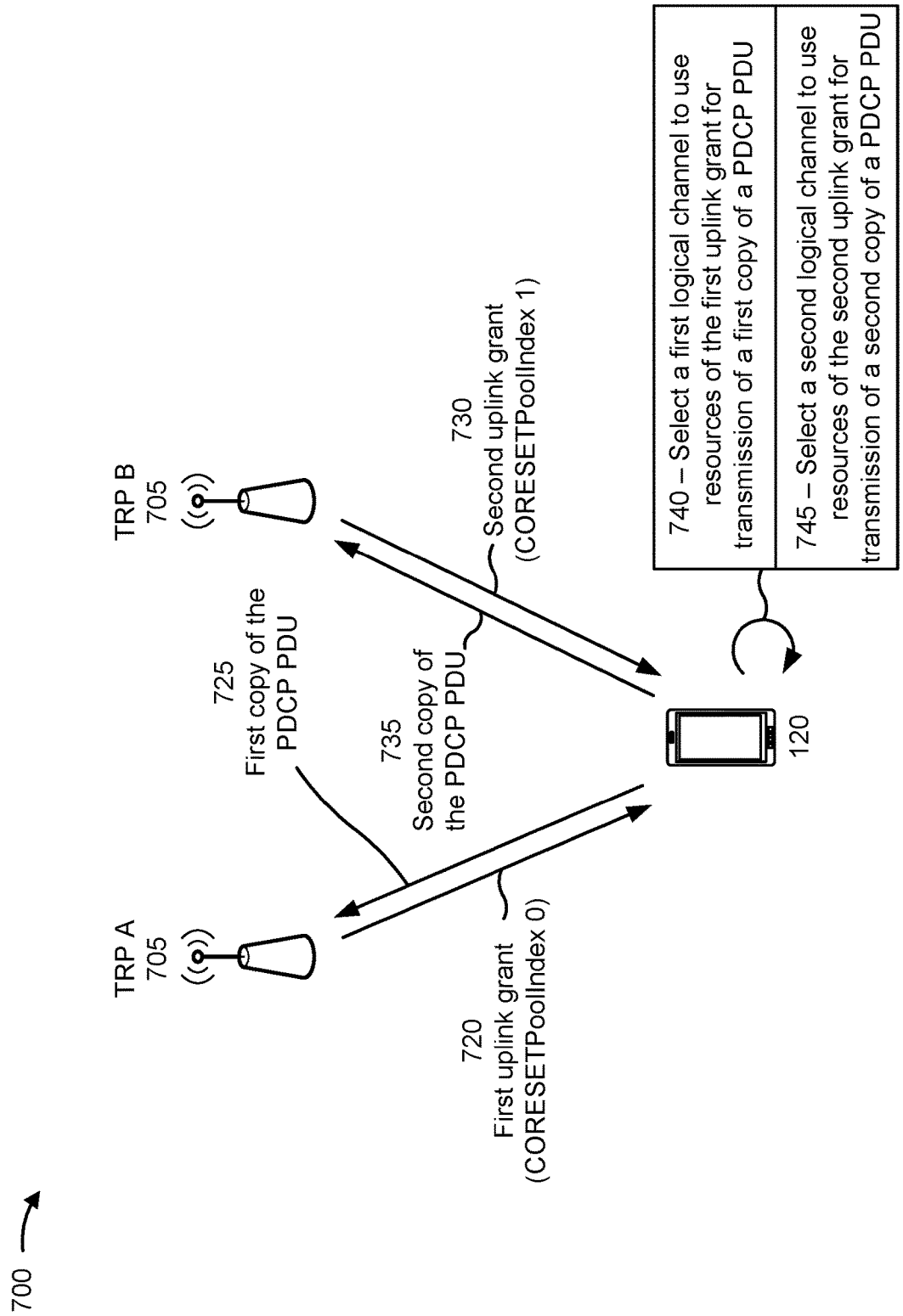

FIGS. 7A and 7B are diagrams illustrating one or more examples associated with LCP restriction based on a CORESET pool index value, in accordance with the present disclosure. FIGS. 7A and 7B include one or more examples of communication between a UE 120 and multiple TRPs 705 (such as TRP A and TRP B), which may include base stations 110, TRPs 335, TRPs 405, TRPs 505, or TRP 605. In some aspects, the UE 120 and the TRPs 705 may be included in a wireless network, such as the wireless network 100. In some aspects, the UE 120 and the TRPs 705 may be deployed in a multi-TRP communication configuration, such as the example multi-TRP communication configuration 400. In some aspects, the multi-TRP communication configuration may be configured for multi-connectivity or carrier aggregation. The UE 120 may communicate with each TRP 705 on a wireless access link, which may include an uplink and a downlink.

In some cases, a UE may be unable to differentiate between TRPs where the TRPs (and the associated RLC layers) use the same carrier or serving cell for purposes of PDCP duplication. While the UE may be capable of identifying a TRP based on the TRP's assigned CORESET pool index value, the UE may not know which logical channels to use for purposes of PDCP duplication on a particular component carrier or serving cell because the restriction of logical channels for the UE may be configured for all TRPs at the component carrier or serving cell level. In other words, a configuration for a particular logical channel may specify the component carriers or serving cells in which the logical channel is allowed to be used. Without further restriction parameters, the UE may be unable to determine which logical channel to use for transmission a copy of an uplink communication (such as a copy of a PDCP PDU) to a particular TRP in a multi-TRP configuration on single component carrier or serving cell if multiple logical channels are allowed for the component carrier or serving cell. As a result, the UE may be unable to reliably perform PDCP duplication for transmitting separate copies of the PDCP PDU to separate TRPs.

Figure 11:
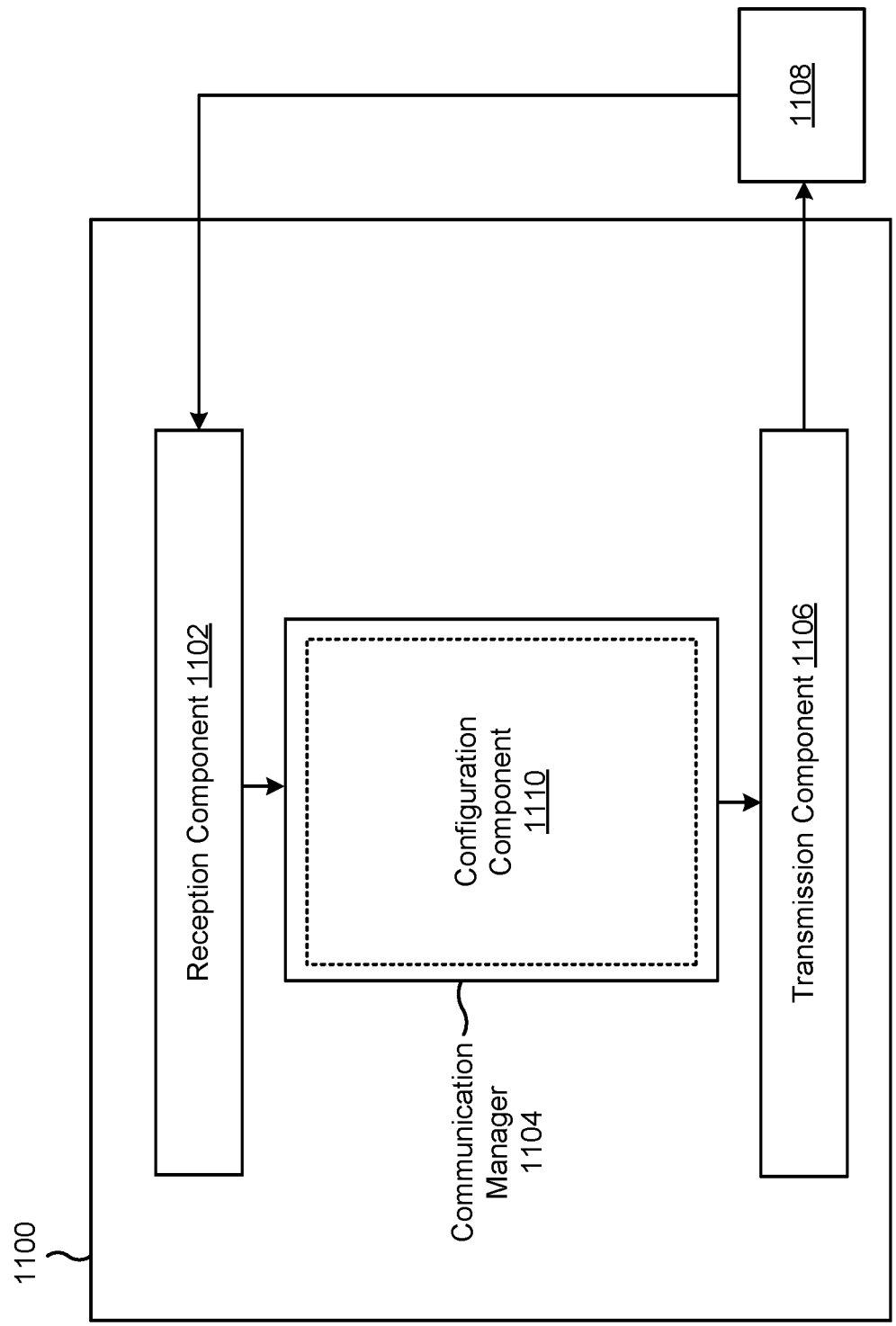
FIG. 11 is a block diagram of an example apparatus for wireless communication, in accordance with the present disclosure.

Accordingly, and as shown in FIG. 7A, a TRP 705 (such as TRP A) may transmit (using controller/processor 240, transmit processor 220, TX MIMO processor 230, MOD 232, antenna 234, memory 242, transmission component 1106 of FIG. 11, or another component) an LCP restriction configuration 710 to the UE 120 for purposes of TRP differentiation. In some aspects, another TRP 705 (such as TRP B) may transmit (e.g., using controller/processor 240, transmit processor 220, TX MIMO processor 230, MOD 232, antenna 234, memory 242, transmission component 1106, or another component) a second LCP restriction configuration 715 to the UE 120. In some aspects, if an LCP restriction configuration is not configured for a particular logical channel, the UE 120 may be permitted to use the logical channel for uplink MAC SDUs for uplink grants associated with no restriction on CORESET pool index values.

An LCP restriction configuration may include a configuration that indicates the CCs or serving cells and CORESET pool index values to which the use of a particular logical channel is restricted. For example, the LCP restriction configuration 710 may indicate one or more combinations of serving cells or CCs and CORESET pool index values for which for a particular logical channel of TRP A is allowed to be used. In some aspects, TRP A may transmit an LCP restriction configuration to the UE 120 for each logical channel associated with TRP A. Similarly, in some aspects, TRP B may transmit an LCP restriction configuration to the UE 120 for each logical channel associated with TRP B.

In some aspects, an LCP restriction configuration may indicate allowed CORESET pool index values for a logical channel on a per-CC or per-serving cell basis. As an example, the LCP restriction configuration 710 may indicate that a logical channel for TRP A is allowed to be used for CORESET pool index 0 and for CC 1, CC 2, and CC 3; may indicate that the logical channel is allowed to be used for CORESET pool index 1 and for CC3; and may indicate that the logical channel is allowed to be used for CORESET pool index 0 and 1 and for CC2. In some aspects, an LCP restriction configuration may indicate allowed CORESET pool index values for a logical channel across multiple or all CCs or serving cells for the UE 120. As an example, the LCP restriction configuration 715 may indicate that a logical channel for TRP B is allowed to be used across multiple or all CCs or serving cells for the UE 120 for CORESET pool index 1.

In some aspects, TRP A may receive (using antenna 234, DEMOD 232, MIMO detector 236, receive processor 238, controller/processor 240, memory 242, reception component 1102 of FIG. 11, or another component) a UE capability indication from the UE 120. TRP A may configure (using transmit processor 220, receive processor 238, controller/processor 240, memory 242, configuration component 1110 of FIG. 11, or another component) the LCP restriction configuration 710 based at least in part on the UE capability associated with the UE 120. For example, TRP A may configure the LCP restriction configuration 710 based at least in part on the UE capability indicating that the UE 120 is capable of multi-TRP operation, based at least in part on a quantity of CCs capable of being supported by the UE 120, based at least in part on a quantity of CORESET pool index values capable of being supported by the UE 120, or UE capability parameters, or a combination thereof. In some aspects, TRP B may configure the LCP restriction configuration 715 in a similar manner.

As shown in FIG. 7B, TRP A may transmit (using controller/processor 240, transmit processor 220, TX MIMO processor 230, MOD 232, antenna 234, memory 242, transmission component 1106, or another component) a first uplink grant 720 to the UE 120. The first uplink grant 720 may be for transmission of an uplink communication such as a first copy of PDCP PDU 725. The UE 120 may receive (using antenna 252, DEMOD 254, MIMO detector 256, receive processor 258, controller/processor 280, memory 282, reception component 1002 of FIG. 10, or another component) the first uplink grant 720 in a DCI communication, in an RRC configuration, or another type of PDCCH communication. In some examples, the first uplink grant 720 may be a Type 1 uplink configured grant that is RRC configured. In some other examples, the first uplink grant 720 may be a Type 2 uplink configured grant that is activated by a DCI communication. In some other examples, the first uplink grant 720 may be a dynamic grant included in a DCI communication.

As further shown in FIG. 7B, TRP B may transmit (using controller/processor 240, transmit processor 220, TX MIMO processor 230, MOD 232, antenna 234, memory 242, transmission component 1106, or another component) a second uplink grant 730 to the UE 120. The second uplink grant 730 for transmission of an uplink communication such as a second copy of PDCP PDU 735. The UE 120 may receive (using antenna 252, DEMOD 254, MIMO detector 256, receive processor 258, controller/processor 280, memory 282, reception component 1002 of FIG. 10, or another component) the second uplink grant 730 in a DCI communication, in an RRC configuration, or another type of PDCCH communication. In some examples, the second uplink grant 730 may be a Type 1 uplink configured grant that is RRC configured. In some other examples, the second uplink grant 730 may be a Type 2 uplink configured grant that is activated by a DCI communication. In some other examples, the second uplink grant 730 may be a dynamic grant included in a DCI communication.

Figure 10:
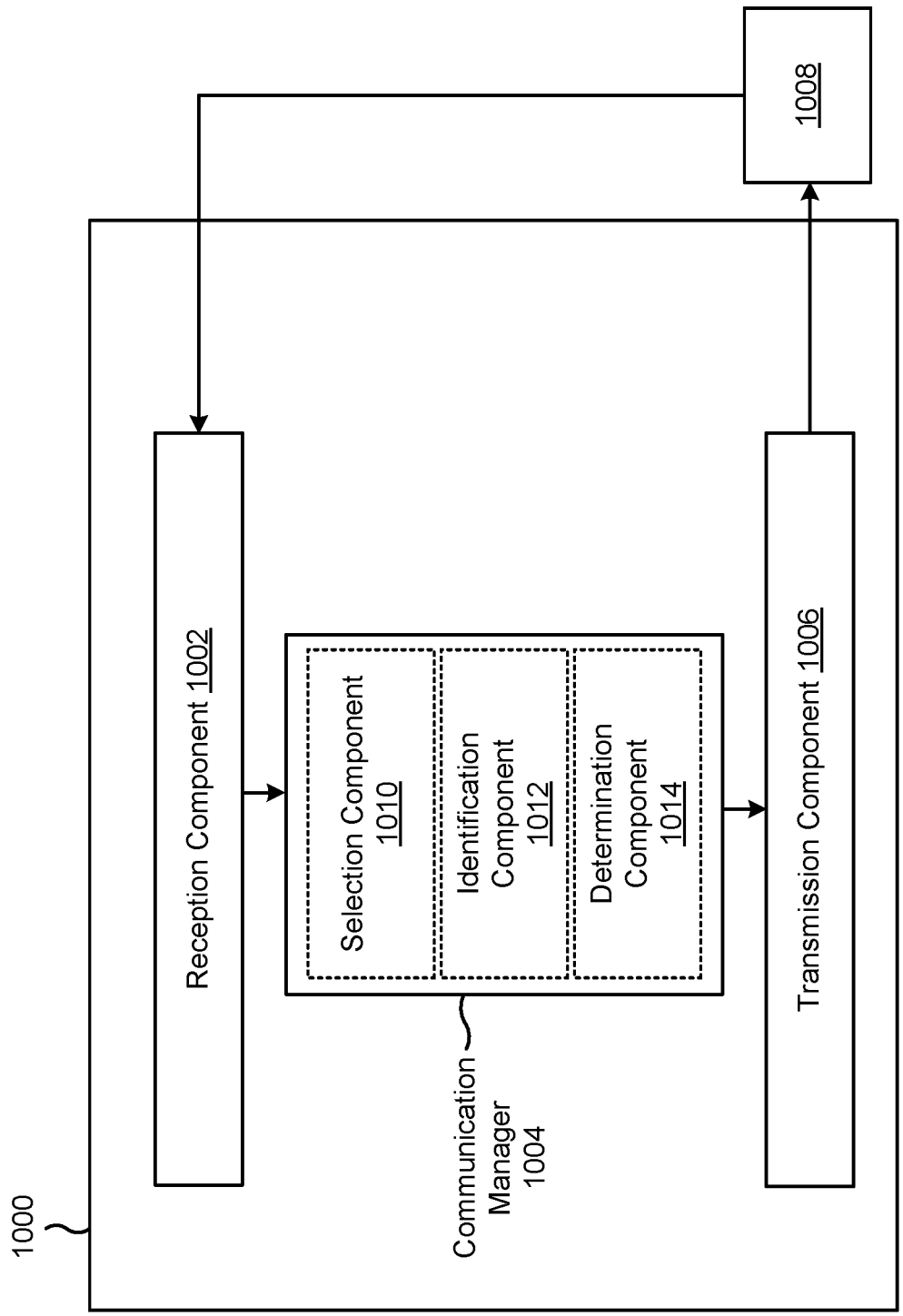
FIG. 10 is a block diagram of an example apparatus for wireless communication, in accordance with the present disclosure.

As further shown in FIG. 7B, in an operation 740, the UE 120 may select (using receive processor 258, transmit processor 264, controller/processor 280, memory 282, selection component 1010 of FIG. 10, or another component) a first logical channel to use the resources (such as one or more symbols, one or more slots, one or more resource blocks, one or more CCs, a combination thereof, or other types of radio resources) of the first uplink grant 720 for transmission of the first copy of the PDCP PDU 725. In some aspects, the UE 120 selects the first logical channel based at least in part on a CORESET pool index value for transmission of the first copy of the PDCP PDU 725 and the LCP restriction configuration 710. For example, the UE 120 may identify (using receive processor 258, transmit processor 264, controller/processor 280, memory 282, identification component 1012 of FIG. 10, or another component) the CC on which the first copy of the PDCP PDU 725 is to be transmitted, such as based at least in part on the CC being indicated by the first uplink grant 720. The UE 120 may determine (using receive processor 258, transmit processor 264, controller/processor 280, memory 282, determination component 1014, or another component) whether the logical channel associated with the LCP restriction configuration 710 is indicated in the LCP restriction configuration 710 as being allowed to be used for the combination of the CC and the CORESET pool index value. If the LCP restriction configuration 710 indicates that the logical channel is allowed to be used for the combination of the CC and the CORESET pool index value (for example, CORESET pool index 0), the UE 120 may select the logical channel to use the resources of the first uplink grant 720 for transmission of the first copy of the PDCP PDU 725.

In some aspects, the UE 120 identifies (using receive processor 258, transmit processor 264, controller/processor 280, memory 282, identification component 1012, or another component) the CORESET pool index value for transmission of the first copy of the PDCP PDU 725 based at least in part on an association between the CORESET pool index value and the first uplink grant 720. For example, the UE 120 may identify (using receive processor 258, transmit processor 264, controller/processor 280, memory 282, identification component 1012, or another component) the CORESET ID of the CORESET in which the DCI communication activating the first uplink grant 720 was received, and may identify (using receive processor 258, transmit processor 264, controller/processor 280, memory 282, identification component 1012, or another component) the CORESET pool index value associated with the CORESET pool in which the CORESET ID is included.

As another example, the UE 120 may identify (using receive processor 258, transmit processor 264, controller/processor 280, memory 282, identification component 1012, or another component) the CORESET ID of the CORESET in which the DCI communication including the first uplink grant 720 was received, and may identify (using receive processor 258, transmit processor 264, controller/processor 280, memory 282, identification component 1012, or another component) the CORESET pool index value associated with the CORESET pool in which the CORESET ID is included. As another example, the UE 120 may identify (using receive processor 258, transmit processor 264, controller/processor 280, memory 282, identification component 1012, or another component) an indication of an association between the CORESET pool index value and the first uplink grant 720 in an RRC configuration for the first uplink grant 720.

As further shown in FIG. 7B, in an operation 745, the UE 120 may select (using receive processor 258, transmit processor 264, controller/processor 280, memory 282, selection component 1010, or another component) a second logical channel to use the resources (such as one or more symbols, one or more slots, one or more resource blocks, one or more CCs, a combination thereof, or other types of radio resources) of the second uplink grant 730 for transmission of the second copy of the PDCP PDU 735. In some aspects, the UE 120 selects the second logical channel based at least in part on a CORESET pool index value for transmission of the second copy of the PDCP PDU 735 and the LCP restriction configuration 715. For example, the UE 120 may identify (using receive processor 258, transmit processor 264, controller/processor 280, memory 282, identification component 1012, or another component) the CC on which the second copy of the PDCP PDU 735 is to be transmitted, such as based at least in part on the CC being indicated by the second uplink grant 730. The UE 120 may determine (using receive processor 258, transmit processor 264, controller/processor 280, memory 282, determination component 1014, or another component) whether the logical channel associated with the LCP restriction configuration 715 is indicated in the LCP restriction configuration 715 as being allowed to be used for the combination of the CC and the CORESET pool index value. If the LCP restriction configuration 715 indicates that the logical channel is allowed to be used for the combination of the CC and the CORESET pool index value (for example, CORESET pool index 1), the UE 120 may select the logical channel to use the resources of the second uplink grant 730 for transmission of the second copy of the PDCP PDU 735.

As further shown in FIG. 7B, the UE 120 may transmit (using controller/processor 280, transmit processor 264, TX MIMO processor 266, MOD 254, antenna 252, memory 282, transmission component 1006 of FIG. 10, or another component) the first copy of the PDCP PDU 725 to TRP A using the first logical channel (and using the resources of the first uplink grant 720). TRP A may receive (using antenna 234, DEMOD 232, MIMO detector 236, receive processor 238, controller/processor 240, memory 242, reception component 1102 of FIG. 11, or another component) the first copy of the PDCP PDU 725 on the first logical channel.

Moreover, the UE 120 may transmit (using controller/processor 280, transmit processor 264, TX MIMO processor 266, MOD 254, antenna 252, memory 282, transmission component 1006, or another component) the second copy of the PDCP PDU 735 to TRP B using the second logical channel (and using the resources of the second uplink grant 730). TRP B may receive (using antenna 234, DEMOD 232, MIMO detector 236, receive processor 238, controller/processor 240, memory 242, reception component 1102, or another component) the second copy of the PDCP PDU 735 on the second logical channel.

Since the first logical channel and the CORESET pool index value of the first uplink grant 720 correspond to TRP A, the use of the LCP restriction configuration 710 enables the UE 120 to differentiate between TRP A and TRP B, to transmit the first copy of the PDCP PDU 725 to TRP A. Similarly, since the second logical channel and the CORESET pool index value of the second uplink grant 730 correspond to TRP B, the use of the LCP restriction configuration 715 enables the UE 120 to differentiate between TRP A and TRP B to transmit the second copy of the PDCP PDU 735 to TRP B. In this way, the UE 120 is capable of using the LCP restriction configurations for purposes of TRP differentiation to transmit separate copies of a PDCP PDU to different TRPs.

FIG. 8 is a flowchart illustrating an example process 800 performed, for example, by a UE in accordance with the present disclosure. Example process 800 is an example where the UE (for example, UE 120) performs operations associated with LCP restriction based on a CORESET pool index value.

As shown in FIG. 8, in some aspects, process 800 may include receiving an LCP restriction configuration for a logical channel indicating one or more CORESET pool index values associated with the logical channel (block 810). For example, the UE (using antenna 252, demodulator 254, MIMO detector 256, receive processor 258, controller/processor 280, memory 282, or another component) may receive an LCP restriction configuration for a logical channel indicating one or more CORESET pool index values associated with the logical channel, as described above.

As further shown in FIG. 8, in some aspects, process 800 may include receiving an uplink grant for transmission of an uplink communication, the uplink grant being associated with a CORESET pool index value of the one or more CORESET pool index values (block 820). For example, the UE (using antenna 252, demodulator 254, MIMO detector 256, receive processor 258, controller/processor 280, memory 282, or another component) may receive an uplink grant for transmission of an uplink communication, the uplink grant being associated with a CORESET pool index value of the one or more CORESET pool index values, as described above.

As further shown in FIG. 8, in some aspects, process 800 may include selecting the logical channel to use resources of the uplink grant for transmission of the uplink communication based at least in part on the CORESET pool index value and the LCP restriction configuration (block 830). For example, the UE (using antenna 252, demodulator 254, MIMO detector 256, receive processor 258, transmit processor 264, TX MIMO processor 266, modulator 254, controller/processor 280, memory 282, or another component) may select the logical channel to use resources of the uplink grant for transmission of the uplink communication based at least in part on the CORESET pool index value and the LCP restriction configuration, as described above.

As further shown in FIG. 8, in some aspects, process 800 may include transmitting the uplink communication using the logical channel (block 840). For example, the UE (using antenna 252, demodulator 254, MIMO detector 256, receive processor 258, transmit processor 264, TX MIMO processor 266, modulator 254, controller/processor 280, memory 282, or another component) may transmit the uplink communication using the logical channel, as described above.

Process 800 may include additional aspects, such as any single aspect or any combination of aspects described below or in connection with one or more other processes described elsewhere herein.

In a first additional aspect, selecting the logical channel to use the resources of the uplink grant comprises identifying a CC for transmission of the uplink communication, determining, based at least in part on the LCP restriction configuration, that the logical channel is allowed to be used for a combination of the CORESET pool index value and the CC, and selecting the logical channel based at least in part on the determination. In a second additional aspect, alone or in combination with the first aspect, the LCP restriction configuration indicates allowed CORESET pool index values, of one or more CORESET pool index values, on a per-CC basis. In a third additional aspect, alone or in combination with one or more of the first and second aspects, the LCP restriction configuration indicates that the one or more CORESET pool index values are allowed to be used for a plurality of CCs.

In a fourth additional aspect, alone or in combination with one or more of the first through third aspects, process 800 includes identifying the CORESET pool index value for transmission of the uplink communication based at least in part on an association between the CORESET pool index value and a CORESET in which a DCI communication activating the uplink grant was received. In a fifth additional aspect, alone or in combination with one or more of the first through fourth aspects, process 800 includes identifying the CORESET pool index value for transmission of the uplink communication based at least in part on an association between the CORESET pool index value and a CORESET in which a DCI communication including the uplink grant was received. In a sixth additional aspect, alone or in combination with one or more of the first through fifth aspects, process 800 includes identifying the CORESET pool index value for transmission of the uplink communication based at least in part on an association between the CORESET pool index value and the uplink grant indicated in an RRC configuration for the uplink grant.

In a seventh additional aspect, alone or in combination with one or more of the first through sixth aspects, the uplink communication comprises a PDCP PDU, and process 800 further comprises receiving a second LCP restriction configuration for a second logical channel indicating one or more second CORESET pool index values associated with the second logical channel, receiving a second uplink grant for transmission of a copy of the PDCP PDU, the second uplink grant being associated with a second CORESET pool index value of the one or more second CORESET pool index values, and selecting the second logical channel to use resources of the second uplink grant for transmission of the copy of the PDCP PDU based at least in part on the second CORESET pool index value.

In an eighth additional aspect, alone or in combination with one or more of the first through seventh aspects, process 800 includes transmitting the PDCP PDU using the logical channel and transmitting the copy of the PDCP PDU using the second logical channel on a same component carrier or on a same serving cell. In a ninth additional aspect, alone or in combination with one or more of the first through eighth aspects, the first CORESET pool index value corresponds to a first TRP and the second CORESET pool index value corresponds to a second TRP.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
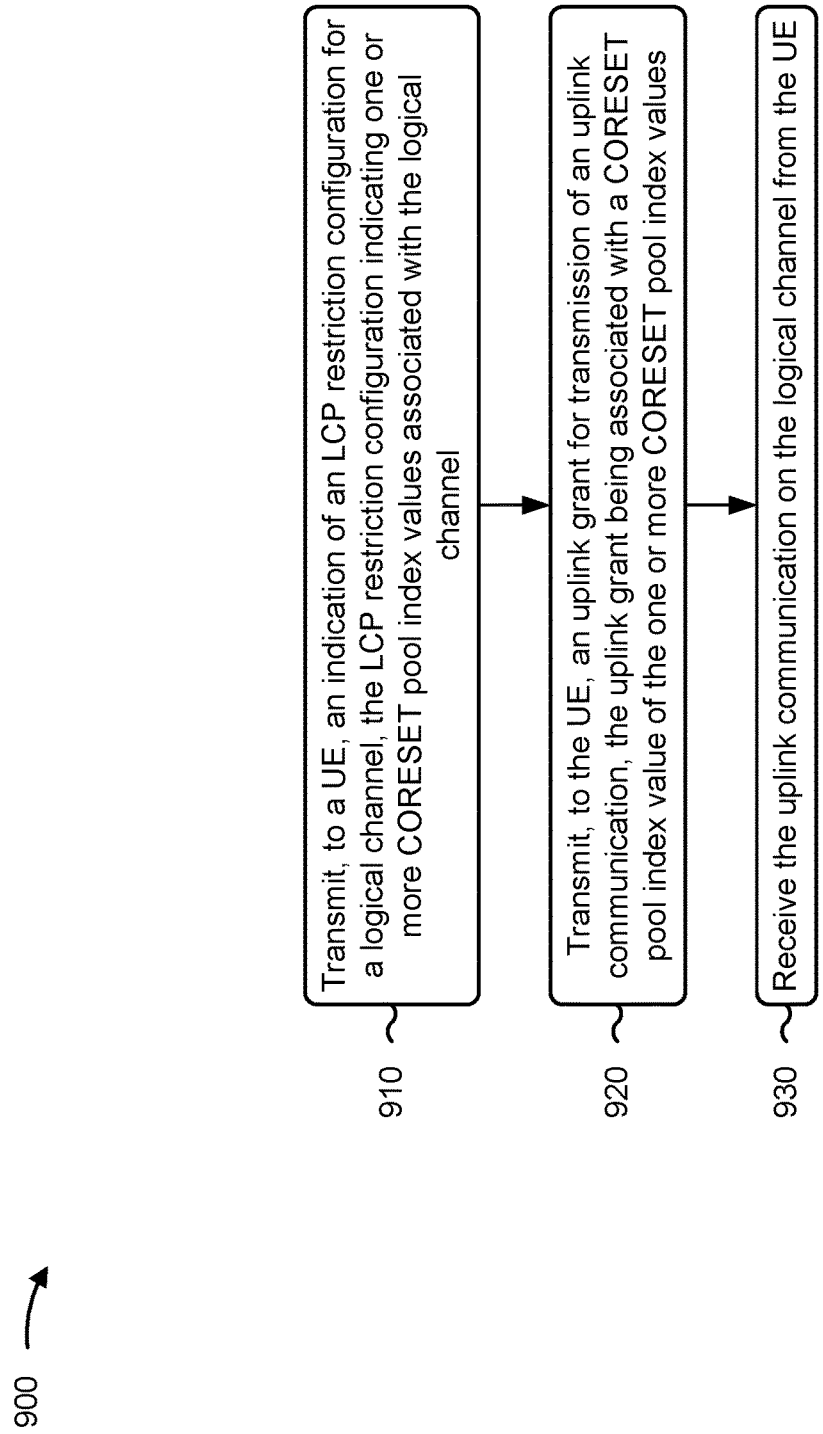
FIG. 9 is a flowchart illustrating an example process performed, for example, by a base station, in accordance with the present disclosure.

FIG. 9 is a flowchart illustrating an example process 900 performed, for example, by a base station in accordance with the present disclosure. Example process 900 is an example where the base station (for example, base station 110, TRP 335, TRP 405, TRP 505, TRP 605, or TRP 705) performs operations associated with LCP restriction based on a CORESET pool index value.

As shown in FIG. 9, in some aspects, process 900 may include transmitting, to a UE, an indication of an LCP restriction configuration for a logical channel, the LCP restriction configuration indicating one or more CORESET pool index values associated with the logical channel (block 910). For example, the base station (for example, using transmit processor 220, TX MIMO processor 230, modulator 232, antenna 234, controller/processor 240, memory 242, scheduler 246, or another component) may transmit, to a UE, an indication of an LCP restriction configuration for a logical channel, the LCP restriction configuration indicating one or more CORESET pool index values associated with the logical channel, as described above.

As further shown in FIG. 9, in some aspects, process 900 may include transmitting, to the UE, an uplink grant for transmission of an uplink communication, the uplink grant being associated with a CORESET pool index value of the one or more CORESET pool index values (block 920). For example, the base station (for example, using transmit processor 220, TX MIMO processor 230, modulator 232, antenna 234, controller/processor 240, memory 242, scheduler 246, or another component) may transmit, to the UE, an uplink grant for transmission of an uplink communication, the uplink grant being associated with a CORESET pool index value of the one or more CORESET pool index values, as described above.

As further shown in FIG. 9, in some aspects, process 900 may include receiving the uplink communication on the logical channel from the UE (block 930). For example, the base station (for example, using antenna 234, demodulator 232, MIMO detector 236, receive processor 238, controller/processor 240, memory 242, or another component) may receive the uplink communication on the logical channel from the UE, as described above.

Process 900 may include additional aspects, such as any single aspect or any combination of aspects described below or in connection with one or more other processes described elsewhere herein.

In a first additional aspect, the LCP restriction configuration indicates allowed CORESET pool index values, of one or more CORESET pool index values, on a per-CC basis. In a second additional aspect, alone or in combination with the first aspect, the LCP restriction configuration indicates that the one or more CORESET pool index values are allowed to be used for a plurality of CCs. In a third additional aspect, alone or in combination with one or more of the first and second aspects, the CORESET pool index value is associated with a CORESET in which a DCI communication activating the uplink grant was transmitted.

In a fourth additional aspect, alone or in combination with one or more of the first through third aspects, the CORESET pool index value is associated with a CORESET in which a DCI communication including the uplink grant was transmitted. In a fifth additional aspect, alone or in combination with one or more of the first through fourth aspects, an association between the CORESET pool index value and the uplink grant is indicated in an RRC configuration for the uplink grant. In a sixth additional aspect, alone or in combination with one or more of the first through fifth aspects, process 900 includes configuring the LCP restriction configuration based at least in part on a UE capability indication received from the UE.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

FIG. 10 is a block diagram of an example apparatus 1000 for wireless communication in accordance with the present disclosure. The apparatus 1000 may be a UE 120, or a UE 120 may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, a TRP, or another wireless communication device) using the reception component 1002 and the transmission component 1006.

In some aspects, the apparatus 1000 may be configured to perform one or more operations described herein in connection with FIGS. 7A and 7B. Additionally or alternatively, the apparatus 1000 may be configured to perform one or more processes described herein, such as process 800 of FIG. 8. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

In some aspects, the communication manager 1004 may receive (or may cause the reception component 1002 to receive), from the apparatus 1008, an LCP restriction configuration for a logical channel indicating one or more CORESET pool index values associated with the logical channel. In some aspects, the communication manager 1004 may receive (or may cause the reception component 1002 to receive), from the apparatus 1008, an uplink grant for transmission of an uplink communication, the uplink grant being associated with a CORESET pool index value of the one or more CORESET pool index values. In some aspects, the communication manager 1004 may select the logical channel to use resources of the uplink grant for transmission of the uplink communication based at least in part on the CORESET pool index value and the LCP restriction configuration. In some aspects, the communication manager 1004 may transmit (or may cause the transmission component 1006 to transmit) the uplink communication using the logical channel. In some aspects, the communication manager 1004 may include a controller/processor, a memory, or a combination thereof, of the UE described above in connection with FIG. 2.

In some aspects, the communication manager 1004 may include a set of components, such as a selection component 1010, an identification component 1012, a determination component 1014, or a combination thereof. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the selection component 1010 may select the logical channel to use resources of the uplink grant for transmission of the uplink communication based at least in part on the CORESET pool index value and the LCP restriction configuration. In some aspects, the identification component 1012 may identify a CC for transmission of the uplink communication, the determination component 1014 may determine, based at least in part on the LCP restriction configuration, that the logical channel is allowed to be used for a combination of the CORESET pool index value and the CC, and the selection component 1010 may select the logical channel based at least in part on the determination of the determination component 1014.

In some aspects, the identification component 1012 may identify the CORESET pool index value for transmission of the uplink communication based at least in part on an association between the CORESET pool index value and a CORESET in which a DCI communication activating the uplink grant was received. In some aspects, the identification component 1012 may identify the CORESET pool index value for transmission of the uplink communication based at least in part on an association between the CORESET pool index value and a CORESET in which a DCI communication including the uplink grant was received. In some aspects, the identification component 1012 may identify the CORESET pool index value for transmission of the uplink communication based at least in part on an association between the CORESET pool index value and the uplink grant indicated in an RRC configuration for the uplink grant.

In some aspects, the uplink communication includes a PDCP PDU, the reception component 1002 may receive, from another apparatus 1008, a second LCP restriction configuration for a second logical channel indicating one or more second CORESET pool index values associated with the second logical channel and may receive a second uplink grant for transmission of a copy of the PDCP PDU, the second uplink grant being associated with a second CORESET pool index value of the one or more second CORESET pool index values, and the selection component 1010 may select the second logical channel to use resources of the second uplink grant for transmission of the copy of the PDCP PDU based at least in part on the second CORESET pool index value. In some aspects the transmission component 106 may transmit (for example, to the apparatus 1008) the PDCP PDU using the logical channel and transmit the copy of the PDCP PDU using the second logical channel on a same component carrier or on a same serving cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

FIG. 11 is a block diagram of an example apparatus 1100 for wireless communication in accordance with the present disclosure. In some aspects, the apparatus 1100 may be a base station 110, a TRP 335, a TRP 405, a TRP 505, a TRP 605, or a TRP 705. In some aspects, a base station 110, a TRP 335, a TRP 405, a TRP 505, a TRP 605, or a TRP 705 may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 7A and 7B. Additionally or alternatively, the apparatus 1100 may be configured to perform one or more processes described herein, such as process 900 of FIG. 9 or a combination thereof. In some aspects, the apparatus 1100 may include one or more components of the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

In some aspects, the communication manager 1104 may transmit (or may cause the transmission component 1106 to transmit), to the apparatus 1108, an indication of an LCP restriction configuration for a logical channel, the LCP restriction configuration indicating one or more CORESET pool index values associated with the logical channel. In some aspects, the communication manager 1104 may transmit (or may cause the transmission component 1106 to transmit), to the apparatus 1108, an uplink grant for transmission of an uplink communication, the uplink grant being associated with a CORESET pool index value of the one or more CORESET pool index values. In some aspects, the communication manager 1104 may receive (or may cause the reception component 1002 to receive) the uplink communication on the logical channel from the apparatus 1108. In some aspects, the communication manager 1104 may include a controller/processor, a memory, a scheduler, a communication unit, or a combination thereof, of the base station described above in connection with FIG. 2.

In some aspects, the communication manager 1104 may include a set of components, such as a configuration component 1110. Alternatively, the set of components may be separate and distinct from the communication manager 1104. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the configuration component 1110 may configure the LCP restriction configuration based at least in part on a UE capability indication received from the apparatus 1108.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a logical channel prioritization (LCP) restriction configuration for a logical channel indicating one or more control resource set (CORESET) pool index values associated with the logical channel; receiving an uplink grant for transmission of an uplink communication, the uplink grant being associated with a CORESET pool index value of the one or more CORESET pool index values; selecting the logical channel to use resources of the uplink grant for transmission of the uplink communication based at least in part on the CORESET pool index value and the LCP restriction configuration; and transmitting the uplink communication using the logical channel.

Aspect 2: The method of Aspect 1, wherein selecting the logical channel to use the resources of the uplink grant comprises: identifying a component carrier (CC) for transmission of the uplink communication; determining, based at least in part on the LCP restriction configuration, that the logical channel is allowed to be used for a combination of the CORESET pool index value and the CC; and selecting the logical channel based at least in part on the determination. Aspect 3: The method of Aspect 1 or 2, wherein the LCP restriction configuration indicates allowed CORESET pool index values, of one or more CORESET pool index values, on a per-component carrier (CC) basis.

Aspect 4: The method of any of Aspects 1-3, wherein the LCP restriction configuration indicates that the one or more CORESET pool index values are allowed to be used for a plurality of component carriers (CC). Aspect 5: The method of any of Aspects 1-4, further comprising identifying the CORESET pool index value for transmission of the uplink communication based at least in part on an association between the CORESET pool index value and a CORESET in which a downlink control information (DCI) communication activating the uplink grant was received. Aspect 6: The method of any of Aspects 1-5, further comprising identifying the CORESET pool index value for transmission of the uplink communication based at least in part on an association between the CORESET pool index value and a CORESET in which a downlink control information (DCI) communication including the uplink grant was received.

Aspect 7: The method of any of Aspects 1-6, further comprising identifying the CORESET pool index value for transmission of the uplink communication based at least in part on an association between the CORESET pool index value and the uplink grant indicated in a radio resource control (RRC) configuration for the uplink grant. Aspect 8: The method of any of Aspects 1-7, wherein the uplink communication comprises a packet data convergence protocol (PDCP) protocol data unit (PDU), and the method further comprises: receiving a second LCP restriction configuration for a second logical channel indicating one or more second CORESET pool index values associated with the second logical channel; receiving a second uplink grant for transmission of a copy of the PDCP PDU, the second uplink grant being associated with a second CORESET pool index value of the one or more second CORESET pool index values; and selecting the second logical channel to use resources of the second uplink grant for transmission of the copy of the PDCP PDU based at least in part on the second CORESET pool index value.

Aspect 9: The method of Aspect 8, further comprising transmitting the PDCP PDU using the logical channel and transmitting the copy of the PDCP PDU using the second logical channel on a same component carrier or on a same serving cell. Aspect 10: The method of Aspect 8 or 9, wherein the first CORESET pool index value corresponds to a first transmit receive point (TRP) and the second CORESET pool index value corresponds to a second TRP.

Aspect 11: A method of wireless communication performed by a base station, comprising: transmitting, to a user equipment (UE), an indication of a logical channel prioritization (LCP) restriction configuration for a logical channel, the LCP restriction configuration indicating one or more control resource set (CORESET) pool index values associated with the logical channel; transmitting, to the UE, an uplink grant for transmission of an uplink communication, the uplink grant being associated with a CORESET pool index value of the one or more CORESET pool index values; and receiving the uplink communication on the logical channel from the UE.

Aspect 12: The method of Aspect 11, wherein the LCP restriction configuration indicates allowed CORESET pool index values, of one or more CORESET pool index values, on a per-component carrier (CC) basis. Aspect 13: The method of Aspect 11 or 12, wherein the LCP restriction configuration indicates that the one or more CORESET pool index values are allowed to be used for a plurality of component carriers (CC).

Aspect 14: The method of any of Aspects 11-13, wherein the CORESET pool index value is associated with a CORESET in which a downlink control information (DCI) communication activating the uplink grant was transmitted. Aspect 15: The method of any of Aspects 11-14, wherein the CORESET pool index value is associated with a CORESET in which a downlink control information (DCI) communication including the uplink grant was transmitted.

Aspect 16: The method of any of Aspects 11-15, wherein an association between the CORESET pool index value and the uplink grant is indicated in a radio resource control (RRC) configuration for the uplink grant. Aspect 17: The method of any of Aspects 11-16, further comprising configuring the LCP restriction configuration based at least in part on a UE capability indication received from the UE.

Aspect 18: An apparatus for wireless communication at a device, comprising a processor; memory coupled with the processor; and instructions stored in the memory and executable by the processor to cause the apparatus to perform the method of one or more of Aspects 1-10. Aspect 19: A device for wireless communication, comprising a memory and one or more processors coupled to the memory, the one or more processors configured to perform the method of one or more of Aspects 1-10. Aspect 20: An apparatus for wireless communication, comprising at least one means for performing the method of one or more of Aspects 1-10.

Aspect 21: A non-transitory computer-readable medium storing code for wireless communication, the code comprising instructions executable by a processor to perform the method of one or more of Aspects 1-10. Aspect 22: A non-transitory computer-readable medium storing a set of instructions for wireless communication, the set of instructions comprising one or more instructions that, when executed by one or more processors of a device, cause the device to perform the method of one or more of Aspects 1-10.

Aspect 23: An apparatus for wireless communication at a device, comprising a processor; memory coupled with the processor; and instructions stored in the memory and executable by the processor to cause the apparatus to perform the method of one or more of Aspects 11-17. Aspect 24: A device for wireless communication, comprising a memory and one or more processors coupled to the memory, the one or more processors configured to perform the method of one or more of Aspects 11-17. Aspect 25: An apparatus for wireless communication, comprising at least one means for performing the method of one or more of Aspects 11-17.

Aspect 26: A non-transitory computer-readable medium storing code for wireless communication, the code comprising instructions executable by a processor to perform the method of one or more of Aspects 11-17. Aspect 27: A non-transitory computer-readable medium storing a set of instructions for wireless communication, the set of instructions comprising one or more instructions that, when executed by one or more processors of a device, cause the device to perform the method of one or more of Aspects 11-17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "of" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
   receiving a logical channel prioritization (LCP) restriction configuration for a logical channel indicating one or more control resource set (CORESET) pool index values associated with the logical channel;
   receiving a second LCP restriction configuration for a second logical channel indicating one or more second CORESET pool index values associated with the second logical channel;
   receiving an uplink grant for transmission of a packet data convergence protocol (PDCP) protocol data unit (PDU), the uplink grant being associated with a CORESET pool index value of the one or more CORESET pool index values;
   receiving a second uplink grant for transmission of a copy of the PDCP PDU, the second uplink grant being associated with a second CORESET pool index value of the one or more second CORESET pool index values;
   selecting the logical channel to use resources of the uplink grant for transmission of the PDCP PDU based at least in part on the CORESET pool index value and the LCP restriction configuration;

selecting the second logical channel to use resources of the second uplink grant for transmission of the copy of the PDCP PDU based at least in part on the second CORESET pool index value; and
transmitting the PDCP PDU using the logical channel.

2. The method of claim 1, wherein selecting the logical channel to use the resources of the uplink grant comprises:
identifying a component carrier (CC) for transmission of the PDCP PDU;
determining, based at least in part on the LCP restriction configuration, that the logical channel is allowed to be used for a combination of the CORESET pool index value and the CC; and
selecting the logical channel based at least in part on the determination.

3. The method of claim 1, wherein the LCP restriction configuration indicates allowed CORESET pool index values, of one or more CORESET pool index values, on a per-component carrier (CC) basis.

4. The method of claim 1, wherein the LCP restriction configuration indicates that the one or more CORESET pool index values are allowed to be used for a plurality of component carriers (CC).

5. The method of claim 1, further comprising identifying the CORESET pool index value for transmission of the PDCP PDU based at least in part on an association between the CORESET pool index value and a CORESET in which a downlink control information (DCI) communication activating the uplink grant was received.

6. The method of claim 1, further comprising identifying the CORESET pool index value for transmission of the PDCP PDU based at least in part on an association between the CORESET pool index value and a CORESET in which a downlink control information (DCI) communication including the uplink grant was received.

7. The method of claim 1, further comprising identifying the CORESET pool index value for transmission of the PDCP PDU based at least in part on an association between the CORESET pool index value and the uplink grant indicated in a radio resource control (RRC) configuration for the uplink grant.

8. The method of claim 1, wherein transmitting the PDCP PDU using the logical channel comprises transmitting the PDCP PDU using the logical channel on a component carrier, and wherein the method further comprises transmitting the copy of the PDCP PDU using the second logical channel on the component carrier.

9. The method of claim 1, wherein the CORESET pool index value corresponds to a first transmit receive point (TRP) and the second CORESET pool index value corresponds to a second TRP.

10. The method of claim 1, wherein transmitting the PDCP PDU using the logical channel comprises transmitting the PDCP PDU using the logical channel on a serving cell, and wherein the method further comprises transmitting the copy of the PDCP PDU using the second logical channel on the serving cell.

11. A method of wireless communication performed by a base station, comprising:
transmitting, to a user equipment (UE), an indication of a logical channel prioritization (LCP) restriction configuration for a logical channel, the LCP restriction configuration indicating one or more control resource set (CORESET) pool index values associated with the logical channel;
transmitting, to the UE, a second LCP restriction configuration for a second logical channel indicating one or more second CORESET pool index values associated with the second logical channel;
transmitting, to the UE, an uplink grant for transmission of a packet data convergence protocol (PDCP) protocol data unit (PDU), the uplink grant being associated with a CORESET pool index value of the one or more CORESET pool index values;
transmitting, to the UE, a second uplink grant for transmission of a copy of the PDCP PDU, the second uplink grant being associated with a second CORESET pool index value of the one or more second CORESET pool index values; and
receiving, from the UE on a same component carrier or a same serving cell, the PDCP PDU on the logical channel and the copy of the PDCP PDU on the second logical channel.

12. The method of claim 11, wherein the LCP restriction configuration indicates allowed CORESET pool index values, of one or more CORESET pool index values, on a per-component carrier (CC) basis.

13. The method of claim 11, wherein the LCP restriction configuration indicates that the one or more CORESET pool index values are allowed to be used for a plurality of component carriers (CC).

14. The method of claim 11, wherein the CORESET pool index value is associated with a CORESET in which a downlink control information (DCI) communication activating the uplink grant was transmitted.

15. The method of claim 11, wherein the CORESET pool index value is associated with a CORESET in which a downlink control information (DCI) communication including the uplink grant was transmitted.

16. The method of claim 11, wherein an association between the CORESET pool index value and the uplink grant is indicated in a radio resource control (RRC) configuration for the uplink grant.

17. The method of claim 11, further comprising configuring the LCP restriction configuration based at least in part on a UE capability indication received from the UE.

18. A user equipment (UE) for wireless communication, comprising:
at least one memory; and
at least one processor coupled to the at least one memory, wherein the at least one processor is configured to:
receive a logical channel prioritization (LCP) restriction configuration for a logical channel indicating one or more control resource set (CORESET) pool index values associated with the logical channel;
receive a second LCP restriction configuration for a second logical channel indicating one or more second CORESET pool index values associated with the second logical channel;
receive an uplink grant for transmission of a packet data convergence protocol (PDCP) protocol data unit (PDU), the uplink grant being associated with a CORESET pool index value of the one or more CORESET pool index values;
receive a second uplink grant for transmission of a copy of the PDCP PDU, the second uplink grant being associated with a second CORESET pool index value of the one or more second CORESET pool index values;
select the logical channel to use resources of the uplink grant for transmission of the PDCP PDU based at least in part on the CORESET pool index value and the LCP restriction configuration;

select the second logical channel to use resources of the second uplink grant for transmission of the copy of the PDCP PDU based at least in part on the second CORESET pool index value; and transmit the PDCP PDU using the logical channel.

19. The UE of claim 18, wherein, to select the logical channel to use the resources of the uplink grant, the at least one processor is configured to:

identify a component carrier (CC) for transmission of the PDCP PDU;

determine, based at least in part on the LCP restriction configuration, that the logical channel is allowed to be used for a combination of the CORESET pool index value and the CC; and select the logical channel based at least in part on the determination.

20. The UE of claim 18, wherein the LCP restriction configuration indicates allowed CORESET pool index values, of one or more CORESET pool index values, on a per-component carrier (CC) basis.

21. The UE of claim 18, wherein the LCP restriction configuration indicates that the one or more CORESET pool index values are allowed to be used for a plurality of component carriers (CC).

22. The UE of claim 18, wherein the at least one processor is configured to identify the CORESET pool index value for transmission of the PDCP PDU based at least in part on an association between the CORESET pool index value and a CORESET in which a downlink control information (DCI) communication activating the uplink grant was received.

23. The UE of claim 18, wherein the at least one processor is configured to identify the CORESET pool index value for transmission of the PDCP PDU based at least in part on an association between the CORESET pool index value and a CORESET in which a downlink control information (DCI) communication including the uplink grant was received.

24. The UE of claim 18, wherein the at least one processor is configured to identify the CORESET pool index value for transmission of the PDCP PDU based at least in part on an association between the CORESET pool index value and the uplink grant indicated in a radio resource control (RRC) configuration for the uplink grant.

25. The UE of claim 18, wherein, to transmit the PDCP PDU using the logical channel, the at least one processor is configured to transmit the PDCP PDU using the logical channel on a serving cell, and wherein the at least one processor is configured to transmit the copy of the PDCP PDU using the second logical channel on the serving cell.

26. The UE of claim 18, wherein, to transmit the PDCP PDU using the logical channel, the at least one processor is configured to transmit the PDCP PDU using the logical channel on a component carrier, and wherein the at least one processor is configured to transmit the copy of the PDCP PDU using the second logical channel on the component carrier.

27. The UE of claim 18, wherein the CORESET pool index value corresponds to a first transmit receive point (TRP) and the second CORESET pool index value corresponds to a second TRP.

28. A base station for wireless communication, comprising:

at least one memory; and at least one processor coupled to the at least one memory, wherein the at least one processor is configured to:

transmit, to a user equipment (UE), an indication of a logical channel prioritization (LCP) restriction configuration for a logical channel, the LCP restriction configuration indicating one or more control resource set (CORESET) pool index values associated with the logical channel;

transmit, to the UE, a second LCP restriction configuration for a second logical channel indicating one or more second CORESET pool index values associated with the second logical channel;

transmit, to the UE, an uplink grant for transmission of a packet data convergence protocol (PDCP) protocol data unit (PDU), the uplink grant being associated with a CORESET pool index value of the one or more CORESET pool index values;

transmit, to the UE, a second uplink grant for transmission of a copy of the PDCP PDU, the second uplink grant being associated with a second CORESET pool index value of the one or more second CORESET pool index values; and receive, from the UE on a same component carrier or a same serving cell, the PDCP PDU on the logical channel and the copy of the PDCP PDU on the second logical channel.

29. The base station of claim 28, wherein the LCP restriction configuration indicates allowed CORESET pool index values, of one or more CORESET pool index values, on a per-component carrier (CC) basis.

30. The base station of claim 28, wherein the LCP restriction configuration indicates that the one or more CORESET pool index values are allowed to be used for a plurality of component carriers (CC).

31. The base station of claim 28, wherein the CORESET pool index value is associated with a CORESET in which a downlink control information (DCI) communication activating the uplink grant was transmitted.

32. The base station of claim 28, wherein the CORESET pool index value is associated with a CORESET in which a downlink control information (DCI) communication including the uplink grant was transmitted.

33. The base station of claim 28, wherein an association between the CORESET pool index value and the uplink grant is indicated in a radio resource control (RRC) configuration for the uplink grant.

\* \* \* \* \*